US012524917B2

(12) United States Patent
Xu et al.

(10) Patent No.: US 12,524,917 B2
(45) Date of Patent: Jan. 13, 2026

(54) VERTEX CONNECTIVITY CODING FOR MESH COMPRESSION

(71) Applicant: Tencent America LLC, Palo Alto, CA (US)

(72) Inventors: Xiaozhong Xu, State College, PA (US); Xiang Zhang, Sunnyvale, CA (US); Jun Tian, Belle Mead, NJ (US); Chao Huang, Palo Alto, CA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 603 days.

(21) Appl. No.: 17/965,611

(22) Filed: Oct. 13, 2022

(65) Prior Publication Data
US 2023/0143284 A1 May 11, 2023

Related U.S. Application Data

(60) Provisional application No. 63/289,026, filed on Dec. 13, 2021, provisional application No. 63/276,459, filed on Nov. 5, 2021.

(51) Int. Cl.
*G06T 9/00* (2006.01)
(52) U.S. Cl.
CPC .................... *G06T 9/001* (2013.01)
(58) Field of Classification Search
None
See application file for complete search history.

(56) References Cited

U.S. PATENT DOCUMENTS

| 6,577,310 B1 * | 6/2003 | Kim .................. G06T 9/001 |
| | | 375/E7.084 |
| 6,982,710 B2 * | 1/2006 | Salomie ............ G06T 17/20 |
| | | 345/420 |

(Continued)

FOREIGN PATENT DOCUMENTS

| GB | 2551387 A | 12/2017 |
| WO | 2017209961 A1 | 12/2017 |

(Continued)

OTHER PUBLICATIONS

International Search Report and Written Opinion issued Jan. 10, 2023 in Application No. PCT/US2022/078282, 15 pages.

(Continued)

*Primary Examiner* — Anand P Bhatnagar
(74) *Attorney, Agent, or Firm* — ArentFox Schiff LLP

(57) ABSTRACT

Processing circuitry decodes, from a bitstream carrying a 3D mesh, coordinates of vertices in the 3D mesh. The 3D mesh represents a surface of an object with polygons, the polygons are defined by the vertices and an original connectivity having original edges connecting the vertices. The processing circuitry derives an inferred connectivity according to the coordinates of the vertices, the inferred connectivity has inferred edges connecting the vertices. The processing circuitry decodes, from the bitstream, connectivity differences. In an example, the connectivity differences are associated with a subset of the vertices. In another example, the connectivity differences are associated with one or more edges in the original edges and the inferred edges. The processing circuitry determines a recovered connectivity according to the inferred connectivity and the connectivity differences, and reconstructs the 3D mesh according to the recovered connectivity.

20 Claims, 20 Drawing Sheets

(56) References Cited

U.S. PATENT DOCUMENTS

| | | | |
|---|---|---|---|
| 10,552,987 B2* | 2/2020 | Laroche | G06T 17/20 |
| 12,067,753 B2* | 8/2024 | Zhang | H04N 19/14 |
| 2003/0052875 A1* | 3/2003 | Salomie | G06T 17/20 |
| | | | 345/419 |
| 2006/0290695 A1* | 12/2006 | Salomie | G06T 17/20 |
| | | | 345/423 |
| 2007/0242894 A1* | 10/2007 | Kautzer | G06T 9/001 |
| | | | 382/243 |
| 2013/0114910 A1 | 5/2013 | Mammou et al. | |
| 2016/0086353 A1 | 3/2016 | Lukac et al. | |
| 2018/0253867 A1* | 9/2018 | Laroche | G06T 17/20 |
| 2018/0342083 A1 | 11/2018 | Onno et al. | |
| 2018/0350153 A1* | 12/2018 | Hemmer | G06T 9/00 |
| 2023/0090677 A1* | 3/2023 | Zhang | G06T 9/001 |
| | | | 382/100 |
| 2023/0177738 A1* | 6/2023 | Huang | G06T 9/20 |
| | | | 375/240.09 |

FOREIGN PATENT DOCUMENTS

| | | | | |
|---|---|---|---|---|
| WO | 2021/136876 A1 | | 7/2021 | |
| WO | WO-2021136878 A1 | * | 7/2021 | G06T 17/20 |

OTHER PUBLICATIONS

Alliez, Pierre, and Desbrun, Mathieu. "Valence-driven connectivity encoding for 3D meshes." In Computer graphics forum, vol. 20, No. 3, pp. 480-489. Oxford, UK and Boston, USA: Blackwell Publishers Ltd, 2001.

Extended European Search Report and Search Opinion received for European Application No. 22890945.3, mailed on Jul. 23, 2025, 12 pages.

Zhang et al., "[V-CG] Tencent's Dynamic Mesh Coding CfP response", International Organisation for standardisation Organisation Internationale De Normalisation ISO/IEC JTC 1/SC 29/WG 7 Coding of moving pictures and audio, m59295, Apr. 2022, pp. 1-16.

Office Action received for Korean Patent Application No. 10-2023-7025504, mailed on Aug. 28, 2025, 10 pages (5 pages of English Translation and 5 pages of Original Document).

* cited by examiner

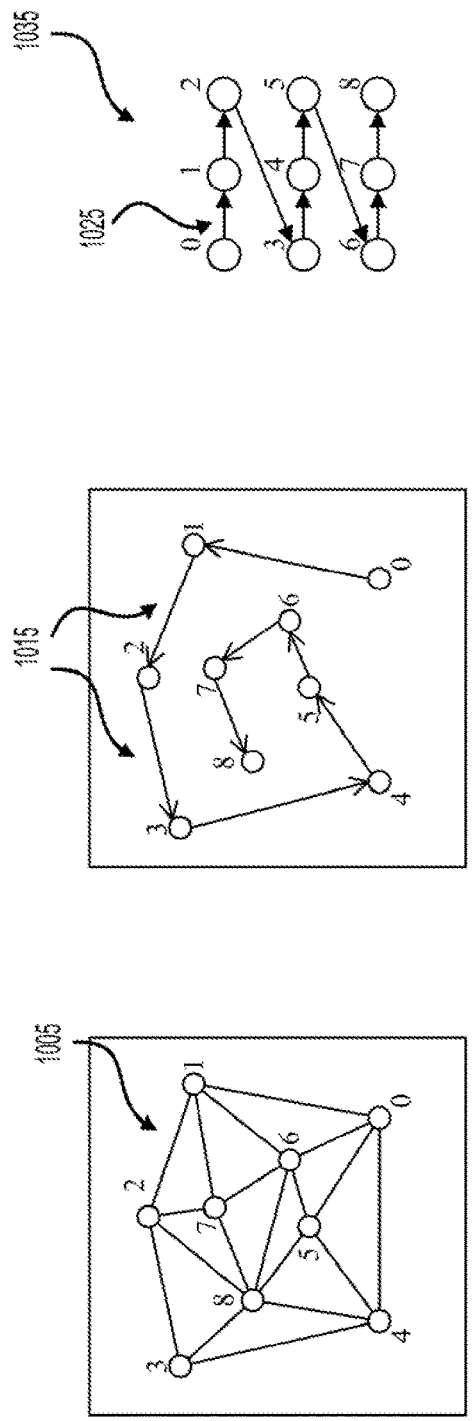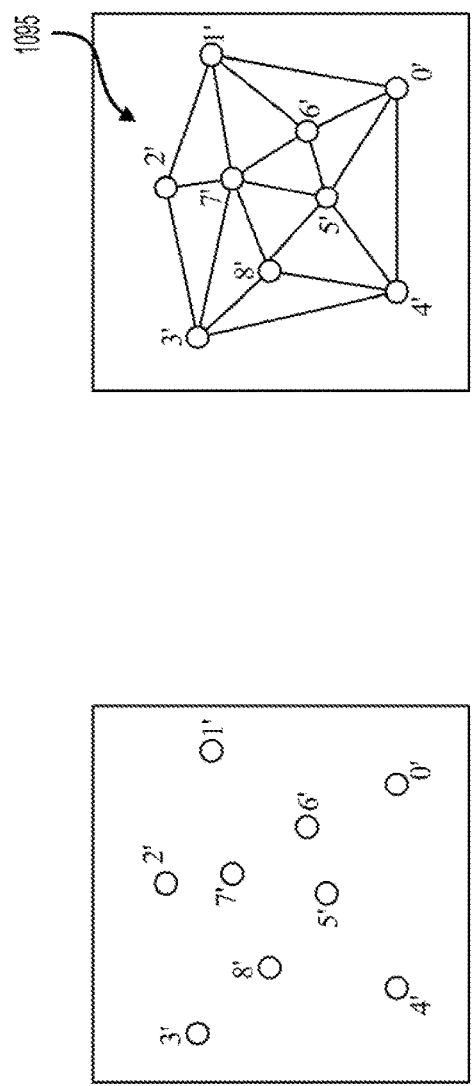
FIG. 10C
FIG. 10E
FIG. 10B
FIG. 10D
FIG. 10A

VERTEX CONNECTIVITY CODING FOR MESH COMPRESSION

INCORPORATION BY REFERENCE

This present application claims the benefit of priority to U.S. Provisional Application No. 63/276,459, "Vertex Connectivity Coding for Mesh Compression" filed on Nov. 5, 2021, and U.S. Provisional Application No. 63/289,026, "Vertex Connectivity Coding for Mesh Compression" filed on Dec. 13, 2021. The entire disclosures of the prior applications are hereby incorporated by reference in their entirety.

TECHNICAL FIELD

The present disclosure describes embodiments generally related to mesh coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Various technologies are developed to capture and represent the world, such as objects in the world, environments in the world, and the like in 3-dimensional (3D) space. 3D representations of the world can enable more immersive forms of interaction and communication. In some examples, point clouds and meshes can be used as 3D representations of the world.

SUMMARY

Aspects of the disclosure provide methods and apparatuses for mesh coding (e.g., compression and decompression). In some examples, an apparatus for mesh coding includes processing circuitry. The processing circuitry decodes, from a bitstream carrying a three dimensional (3D) mesh, coordinates of vertices in the 3D mesh. The 3D mesh represents a surface of an object with polygons, the polygons are defined by the vertices and an original connectivity having original edges connecting the vertices. The processing circuitry derives an inferred connectivity according to the coordinates of the vertices, the inferred connectivity has inferred edges connecting the vertices. The processing circuitry decodes, from the bitstream, connectivity differences associated with a subset of the vertices, determines a recovered connectivity according to the inferred connectivity and the connectivity differences, and reconstructs the 3D mesh according to the recovered connectivity.

In some examples, to decode the connectivity differences, a first value is decoded from the bitstream, the first value indicates a number for vertices in the subset of the vertices. The processing circuitry decodes a first index for a first vertex in the subset of the vertices, and decodes a second value from the bitstream, the second value indicates a number for connectivity corrections associated with the first vertex. The processing circuitry decodes a sequence of indices indicating a set of vertices respectively corresponding to the connectivity corrections associated with the first vertex.

In some examples, to determine the recovered connectivity, the processing circuitry determines a second index for a second vertex corresponding to a connectivity correction, and in response to an existence of a first edge connecting the first vertex and the second vertex in the inferred edges, the processing circuitry removes the first edge from the recovered connectivity. Further in an example, in response to the first vertex and the second vertex being a first pair of diagonal vertices of a quadrilateral, the processing circuitry adds a second edge connecting a second pair of diagonal vertices of the quadrilateral in the recovered connectivity.

In some examples, to determine the recovered connectivity, the processing circuitry determines a second index of a second vertex corresponding to a connectivity correction, and in response to a nonexistence of a first edge connecting the first vertex and the second vertex in the inferred edges, the processing circuitry adds the first edge connecting the first vertex and the second vertex in the recovered connectivity. In an example, in response to the first vertex and the second vertex being a first pair of diagonal vertices of a quadrilateral, the processing circuitry removes a second edge connecting a second pair of diagonal vertices of the quadrilateral from the recovered connectivity.

In some examples, to decode the sequence of indices indicating the set of vertices respectively corresponding to the connectivity corrections, the processing circuitry decodes, from the bitstream a first signal indicating a second index for a second vertex, and decodes a second signal from the bitstream, the second signal is a difference between the second index and a third index for a third vertex in the sequence of indices.

In some examples, to derive the inferred connectivity and decode the connectivity differences, the processing circuitry derives, for a first vertex, a first set of vertices that is connected with the first vertex in the inferred connectivity. The processing circuitry decodes a flag associated with the first vertex from the bitstream, the flag indicates whether one of more connectivity corrections are associated with the first vertex. In an example, the flag indicates one or more connectivity corrections associated with the first vertex, the processing circuitry decodes, from the bitstream, a sequence of indices indicating a second set of vertices respectively corresponding to the one or more connectivity corrections associated with the first vertex.

In some examples, to decode the connectivity differences, the processing circuitry decodes an index of a first vertex in the subset of the vertices from the bitstream, decodes a valence difference from the bitstream, and determines a recovered valence of the first vertex by adding the valence difference with an inferred valence of the first vertex in the inferred connectivity.

In some embodiments, the processing circuitry decodes, from a bitstream carrying a three dimensional (3D) mesh, coordinates of vertices in the 3D mesh. The 3D mesh represents a surface of an object with polygons, the polygons are defined by the vertices and an original connectivity having original edges connecting the vertices. The processing circuitry derives, according to the coordinates of the vertices, an inferred connectivity having inferred edges that connect the vertices, and decodes, from the bitstream, connectivity differences associated with one or more edges in the original edges and the inferred edges. The processing circuitry determines a recovered connectivity according to the inferred connectivity and the connectivity differences, and reconstructs the 3D mesh according to the recovered connectivity.

In some examples, to decode the connectivity differences, the processing circuitry decodes signals in the bitstream that indicate a first vertex and a second vertex of a first edge. In an example, the processing circuitry decodes a first value corresponding to a first index of the first vertex, and decodes a second value corresponding to a difference between the first index and a second index of the second vertex.

In some examples, to determine the recovered connectivity, in response to an existence of the first edge connecting the first vertex and the second vertex in the inferred edges, the processing circuitry removes the first edge from the recovered connectivity. In an example, in response to the first vertex and the second vertex being a first pair of diagonal vertices of a quadrilateral, the processing circuitry adds a second edge connecting a second pair of diagonal vertices of the quadrilateral in the recovered connectivity.

In some examples, to determine the recovered connectivity, in response to a nonexistence of the first edge connecting the first vertex and the second vertex in the inferred edges, the processing circuitry adds the first edge connecting the first vertex and the second vertex in the recovered connectivity. In an example, in response to the first vertex and the second vertex being a first pair of diagonal vertices of a quadrilateral, the processing circuitry removes a second edge connecting a second pair of diagonal vertices of the quadrilateral from the recovered connectivity.

In some examples, to decode the connectivity differences, the processing circuitry decodes flags respectively associated with the inferred edges, a flag associated with an inferred edge indicates whether the inferred edge exists in the original edges.

Aspects of the disclosure also provide a non-transitory computer-readable medium storing instructions which when executed by a computer cause the computer to perform any one or a combination of the methods for mesh coding.

BRIEF DESCRIPTION OF THE DRAWINGS

Further features, the nature, and various advantages of the disclosed subject matter will be more apparent from the following detailed description and the accompanying drawings in which:

FIGS. 10A-10E show an example of using vertex reordering for mesh compression.

DETAILED DESCRIPTION OF EMBODIMENTS

Figure 1:
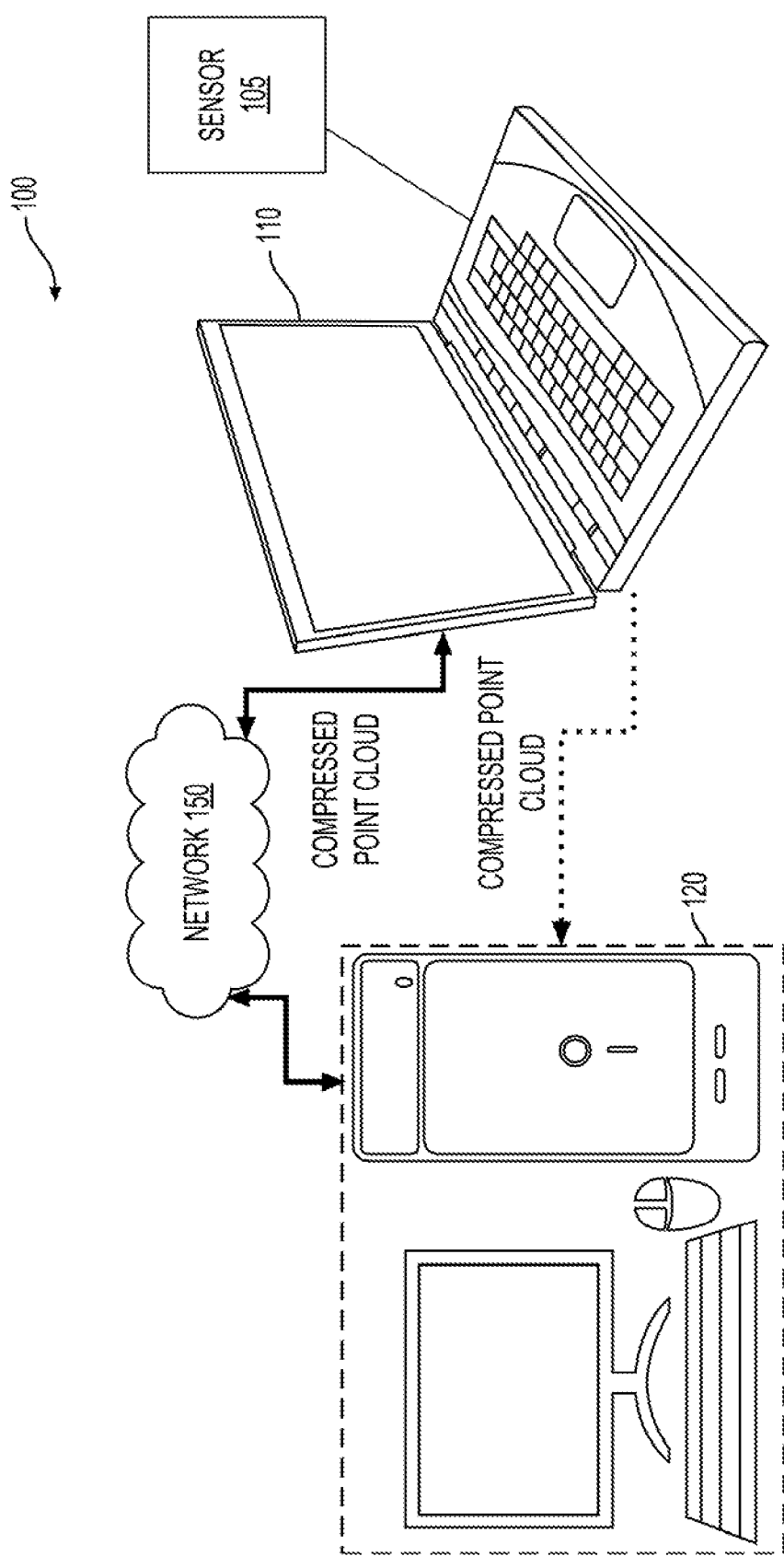
FIG. 1 shows a block diagram of a communication system in some examples.

Aspects of the disclosure provide techniques in the field of three dimensional (3D) media processing.

Technology developments in 3D media processing, such as advances in three dimensional (3D) capture, 3D modeling, and 3D rendering, and the like have promoted the ubiquitous presence of 3D media contents across several platforms and devices. In an example, a baby's first step can be captured in one continent, media technology can allow grandparents to view (and maybe interact) and enjoy an immersive experience with the baby in another continent. According to an aspect of the disclosure, in order to improve immersive experience, 3D models are becoming ever more sophisticated, and the creation and consumption of 3D models occupy a significant amount of data resources, such as data storage, data transmission resources.

According to some aspects of the disclosure, point clouds and meshes can be used as 3D models to represent immersive contents.

A point cloud generally may refer to a set of points in a 3D space, each with associated attributes, such as color, material properties, texture information, intensity attributes, reflectivity attributes, motion related attributes, modality attributes, and various other attributes. Point clouds can be used to reconstruct an object or a scene as a composition of such points.

A mesh (also referred to as mesh model) of an object can include polygons that describe the surface of the object. Each polygon can be defined by vertices of the polygon in 3D space and the information of how the vertices are connected into the polygon. The information of how the vertices are connected is referred to as connectivity information. In some examples, the mesh can also include attributes, such as color, normal, and the like, associated with the vertices.

According to some aspects of the disclosure, some coding tools for point cloud compression (PCC) can be used for mesh compression. For example, a mesh can be re-meshed to generate a new mesh that the connectivity information of the new mesh can be inferred. The vertices of the new mesh, and the attributes associated with the vertices of the new mesh can be considered as points in a point cloud and can be compressed using PCC codecs.

Point clouds can be used to reconstruct an object or a scene as a composition of points. The points can be captured using multiple cameras, depth sensors or Lidar in various setups and may be made up of thousands up to billions of points in order to realistically represent reconstructed scenes or objects. A patch generally may refer to a contiguous subset of the surface described by the point cloud. In an example, a patch includes points with surface normal vectors that deviate from one another less than a threshold amount.

PCC can be performed according to various schemes, such as a geometry-based scheme that is referred to as G-PCC, a video coding based scheme that is referred to as V-PCC, and the like. According to some aspects of the disclosure, the G-PCC encodes the 3D geometry directly and is a purely geometry-based approach without much to share with video coding, and the V-PCC is heavily based on video coding. For example, V-PCC can map a point of the 3D cloud to a pixel of a 2D grid (an image). The V-PCC scheme can utilize generic video codecs for point cloud compression. A PCC codec (encoder/decoder) in the present disclosure can be G-PCC codec (encoder/decoder) or V-PCC codec.

According to an aspect of the disclosure, the V-PCC scheme can use existing video codecs to compress the geometry, occupancy, and texture of a point cloud as three separate video sequences. The extra metadata needed to interpret the three video sequences is compressed separately. A small portion of the overall bitstream is the metadata, which could be encoded/decoded efficiently using software implementation in an example. The bulk of the information is handled by the video codec.

FIG. 1 illustrates a block diagram of a communication system (100) in some examples. The communication system (100) includes a plurality of terminal devices that can communicate with each other, via, for example, a network (150). For example, the communication system (100) includes a pair of terminal devices (110) and (120) interconnected via the network (150). In the FIG. 1 example, the first pair of terminal devices (110) and (120) may perform unidirectional transmission of point cloud data. For example, the terminal device (110) may compress a point cloud (e.g., points representing a structure) that is captured by a sensor (105) connected with the terminal device (110). The compressed point cloud can be transmitted, for example in the form of a bitstream, to the other terminal device (120) via the network (150). The terminal device (120) may receive the compressed point cloud from the network (150), decompress the bitstream to reconstruct the point cloud, and suitably display the reconstructed point cloud. Unidirectional data transmission may be common in media serving applications and the like.

In the FIG. 1 example, the terminal devices (110) and (120) may be illustrated as servers, and personal computers, but the principles of the present disclosure may be not so limited. Embodiments of the present disclosure find application with laptop computers, tablet computers, smart phones, gaming terminals, media players, and/or dedicated three-dimensional (3D) equipment. The network (150) represents any number of networks that transmit compressed point cloud between the terminal devices (110) and (120). The network (150) can include for example wireline (wired) and/or wireless communication networks. The network (150) may exchange data in circuit-switched and/or packet-switched channels. Representative networks include telecommunications networks, local area networks, wide area networks, the Internet, and the like.

Figure 2:
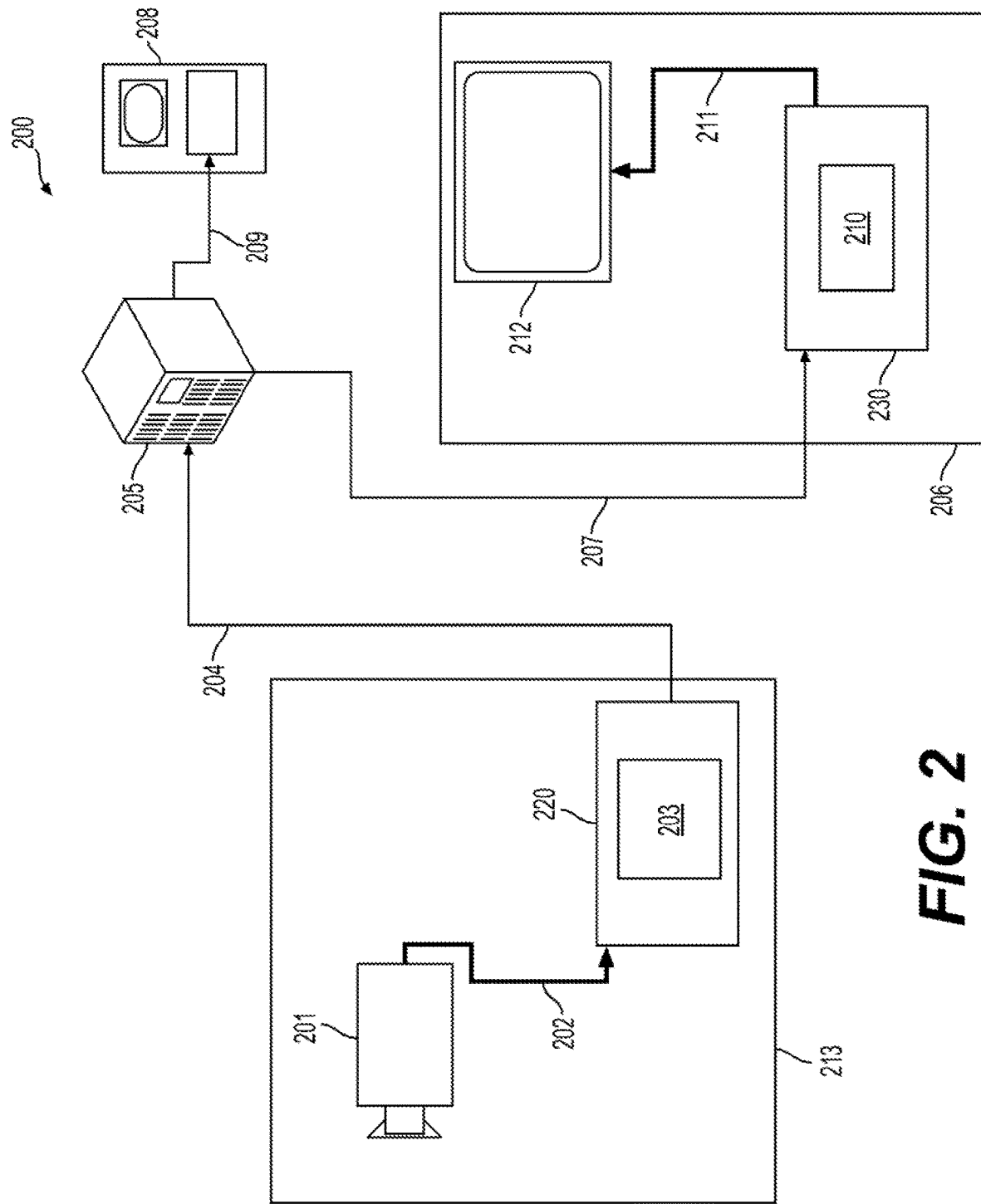
FIG. 2 shows a block diagram of a streaming system in some examples.

FIG. 2 illustrates a block diagram of a streaming system (200) in some examples. The streaming system (200) is a use application of point cloud. The disclosed subject matter can be equally applicable to other point cloud enabled applications, such as, 3D telepresence application, virtual reality application, and the like.

The streaming system (200) may include a capture subsystem (213). The capture subsystem (213) can include a point cloud source (201), for example light detection and ranging (LIDAR) systems, 3D cameras, 3D scanners, a graphics generation component that generates the uncompressed point cloud in software, and the like that generates for example point clouds (202) that are uncompressed. In an example, the point clouds (202) include points that are captured by the 3D cameras. The point clouds (202), depicted as a bold line to emphasize a high data volume when compared to compressed point clouds (204) (a bitstream of compressed point clouds). The compressed point clouds (204) can be generated by an electronic device (220) that includes an encoder (203) coupled to the point cloud source (201). The encoder (203) can include hardware, software, or a combination thereof to enable or implement aspects of the disclosed subject matter as described in more detail below. The compressed point clouds (204) (or bitstream of compressed point clouds (204)), depicted as a thin line to emphasize the lower data volume when compared to the stream of point clouds (202), can be stored on a streaming server (205) for future use. One or more streaming client subsystems, such as client subsystems (206) and (208) in FIG. 2 can access the streaming server (205) to retrieve copies (207) and (209) of the compressed point cloud (204). A client subsystem (206) can include a decoder (210), for example, in an electronic device (230). The decoder (210) decodes the incoming copy (207) of the compressed point clouds and creates an outgoing stream of reconstructed point clouds (211) that can be rendered on a rendering device (212).

It is noted that the electronic devices (220) and (230) can include other components (not shown). For example, the electronic device (220) can include a decoder (not shown) and the electronic device (230) can include an encoder (not shown) as well.

In some streaming systems, the compressed point clouds (204), (207), and (209) (e.g., bitstreams of compressed point clouds) can be compressed according to certain standards. In some examples, video coding standards are used in the compression of point clouds. Examples of those standards include, High Efficiency Video Coding (HEVC), Versatile Video Coding (VVC), and the like.

Figure 3:
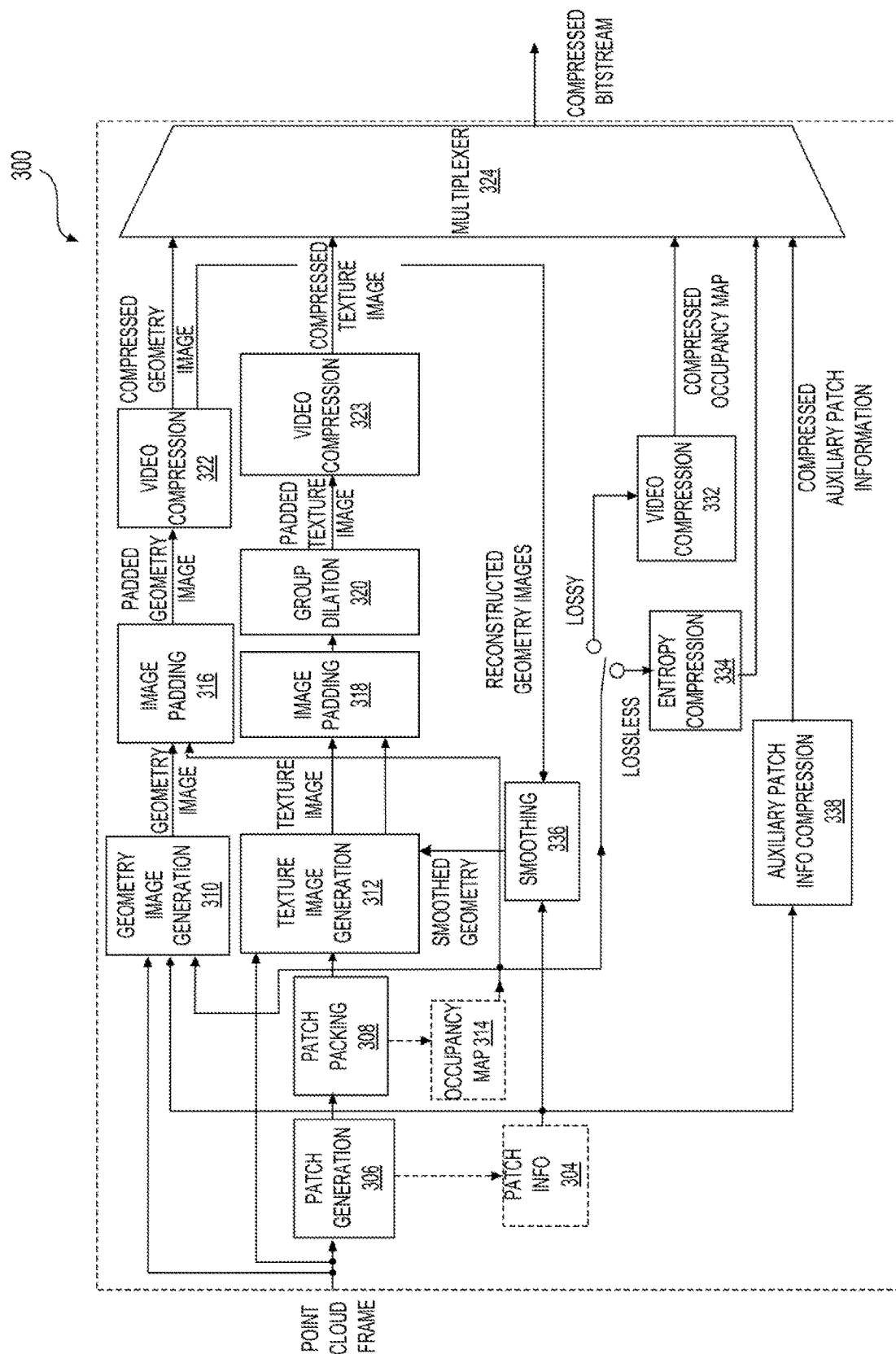
FIG. 3 shows a block diagram of an encoder for encoding point cloud frames in some examples.

FIG. 3 shows a block diagram of a V-PCC encoder (300) for encoding point cloud frames, according to some embodiments. In some embodiments, the V-PCC encoder (300) can be used in the communication system (100) and streaming system (200). For example, the encoder (203) can be configured and operate in a similar manner as the V-PCC encoder (300).

The V-PCC encoder (300) receives point cloud frames as uncompressed inputs and generates bitstream corresponding to compressed point cloud frames. In some embodiments, the V-PCC encoder (300) may receive the point cloud frames from a point cloud source, such as the point cloud source (201) and the like.

In the FIG. 3 example, the V-PCC encoder (300) includes a patch generation module (306), a patch packing module (308), a geometry image generation module (310), a texture image generation module (312), a patch info module (304), an occupancy map module (314), a smoothing module (336), image padding modules (316) and (318), a group dilation module (320), video compression modules (322), (323) and (332), an auxiliary patch info compression module (338), an entropy compression module (334), and a multiplexer (324).

According to an aspect of the disclosure, the V-PCC encoder (300), converts 3D point cloud frames into image-based representations along with some metadata (e.g., occupancy map and patch info) that is used to convert the compressed point cloud back into a decompressed point cloud. In some examples, the V-PCC encoder (300) can convert 3D point cloud frames into geometry images, texture images and occupancy maps, and then use video coding techniques to encode the geometry images, texture images and occupancy maps into a bitstream. Generally, a geometry image is a 2D image with pixels filled with geometry values associated with points projected to the pixels, and a pixel filled with a geometry value can be referred to as a geometry sample. A texture image is a 2D image with pixels filled with texture values associated with points projected to the pixels, and a pixel filled with a texture value can be referred to as a texture sample. An occupancy map is a 2D image with pixels filled with values that indicate occupied or unoccupied by patches.

The patch generation module (306) segments a point cloud into a set of patches (e.g., a patch is defined as a contiguous subset of the surface described by the point cloud), which may be overlapping or not, such that each patch may be described by a depth field with respect to a plane in 2D space. In some embodiments, the patch generation module (306) aims at decomposing the point cloud into a minimum number of patches with smooth boundaries, while also minimizing the reconstruction error.

In some examples, the patch info module (304) can collect the patch information that indicates sizes and shapes of the patches. In some examples, the patch information can be packed into an image frame and then encoded by the auxiliary patch info compression module (338) to generate the compressed auxiliary patch information.

In some examples, the patch packing module (308) is configured to map the extracted patches onto a 2 dimensional (2D) grid while minimize the unused space and guarantee that every M×M (e.g., 16×16) block of the grid is associated with a unique patch. Efficient patch packing can directly impact the compression efficiency either by minimizing the unused space or ensuring temporal consistency.

The geometry image generation module (310) can generate 2D geometry images associated with geometry of the point cloud at given patch locations. The texture image generation module (312) can generate 2D texture images associated with texture of the point cloud at given patch locations. The geometry image generation module (310) and the texture image generation module (312) exploit the 3D to 2D mapping computed during the packing process to store the geometry and texture of the point cloud as images. In order to better handle the case of multiple points being projected to the same sample, each patch is projected onto two images, referred to as layers. In an example, geometry image is represented by a monochromatic frame of W×H in YUV420-8 bit format. To generate the texture image, the texture generation procedure exploits the reconstructed/smoothed geometry in order to compute the colors to be associated with the re-sampled points.

The occupancy map module (314) can generate an occupancy map that describes padding information at each unit. For example, the occupancy image includes a binary map that indicates for each cell of the grid whether the cell belongs to the empty space or to the point cloud. In an example, the occupancy map uses binary information describing for each pixel whether the pixel is padded or not. In another example, the occupancy map uses binary information describing for each block of pixels whether the block of pixels is padded or not.

The occupancy map generated by the occupancy map module (314) can be compressed using lossless coding or lossy coding. When lossless coding is used, the entropy compression module (334) is used to compress the occupancy map. When lossy coding is used, the video compression module (332) is used to compress the occupancy map.

It is noted that the patch packing module (308) may leave some empty spaces between 2D patches packed in an image frame. The image padding modules (316) and (318) can fill the empty spaces (referred to as padding) in order to generate an image frame that may be suited for 2D video and image codecs. The image padding is also referred to as background filling which can fill the unused space with redundant information. In some examples, a good background filling minimally increases the bit rate while does not introduce significant coding distortion around the patch boundaries.

The video compression modules (322), (323), and (332) can encode the 2D images, such as the padded geometry images, padded texture images, and occupancy maps based on a suitable video coding standard, such as HEVC, VVC and the like. In an example, the video compression modules (322), (323), and (332) are individual components that operate separately. It is noted that the video compression modules (322), (323), and (332) can be implemented as a single component in another example.

In some examples, the smoothing module (336) is configured to generate a smoothed image of the reconstructed geometry image. The smoothed image can be provided to the texture image generation (312). Then, the texture image generation (312) may adjust the generation of the texture image based on the reconstructed geometry images. For example, when a patch shape (e.g. geometry) is slightly distorted during encoding and decoding, the distortion may be taken into account when generating the texture images to correct for the distortion in patch shape.

In some embodiments, the group dilation (320) is configured to pad pixels around the object boundaries with redundant low-frequency content in order to improve coding gain as well as visual quality of reconstructed point cloud.

The multiplexer (324) can multiplex the compressed geometry image, the compressed texture image, the compressed occupancy map, the compressed auxiliary patch information into a compressed bitstream.

Figure 4:
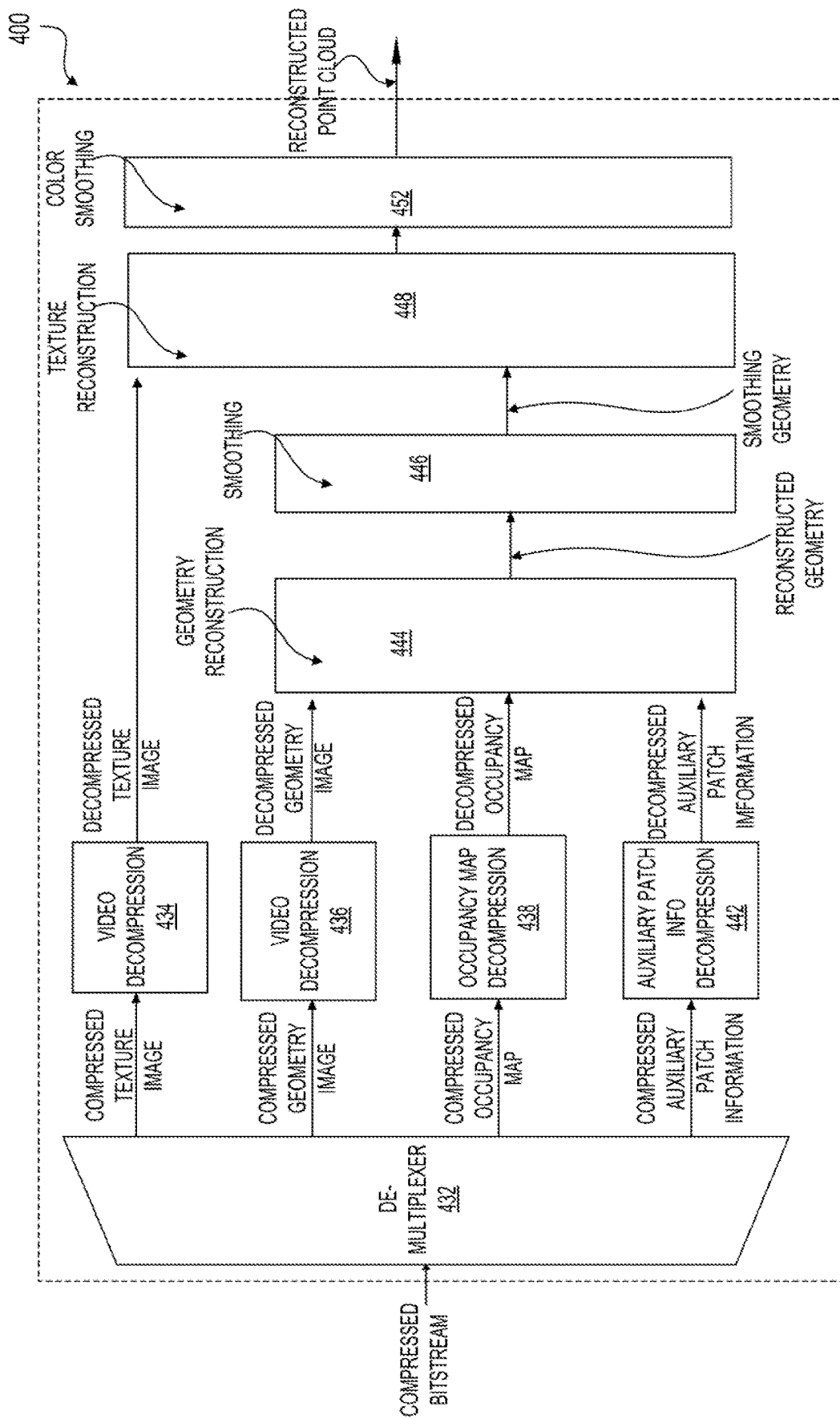
FIG. 4 shows a block diagram of a decoder for decoding a compressed bitstream corresponding to point cloud frames in some examples.

FIG. 4 shows a block diagram of a V-PCC decoder (400) for decoding compressed bitstream corresponding to point cloud frames, in some examples. In some examples, the V-PCC decoder (400) can be used in the communication system (100) and streaming system (200). For example, the decoder (210) can be configured to operate in a similar manner as the V-PCC decoder (400). The V-PCC decoder (400) receives the compressed bitstream, and generates reconstructed point cloud based on the compressed bitstream.

In the FIG. 4 example, the V-PCC decoder (400) includes a de-multiplexer (432), video decompression modules (434) and (436), an occupancy map decompression module (438), an auxiliary patch-information decompression module (442), a geometry reconstruction module (444), a smoothing module (446), a texture reconstruction module (448), and a color smoothing module (452).

The de-multiplexer (432) can receive and separate the compressed bitstream into compressed texture image, compressed geometry image, compressed occupancy map, and compressed auxiliary patch information.

The video decompression modules (434) and (436) can decode the compressed images according to a suitable standard (e.g., HEVC, VVC, etc.) and output decompressed images. For example, the video decompression module (434) decodes the compressed texture images and outputs decompressed texture images; and the video decompression module (436) decodes the compressed geometry images and outputs the decompressed geometry images.

The occupancy map decompression module (438) can decode the compressed occupancy maps according to a suitable standard (e.g., HEVC, VVC, etc.) and output decompressed occupancy maps.

The auxiliary patch-information decompression module (442) can decode the compressed auxiliary patch information according to a suitable standard (e.g., HEVC, VVC, etc.) and output decompressed auxiliary patch information.

The geometry reconstruction module (444) can receive the decompressed geometry images, and generate reconstructed point cloud geometry based on the decompressed occupancy map and decompressed auxiliary patch information.

The smoothing module (446) can smooth incongruences at edges of patches. The smoothing procedure aims at alleviating potential discontinuities that may arise at the patch boundaries due to compression artifacts. In some embodiments, a smoothing filter may be applied to the pixels located on the patch boundaries to alleviate the distortions that may be caused by the compression/decompression.

The texture reconstruction module (448) can determine texture information for points in the point cloud based on the decompressed texture images and the smoothing geometry.

The color smoothing module (452) can smooth incongruences of coloring. Non-neighboring patches in 3D space are often packed next to each other in 2D videos. In some examples, pixel values from non-neighboring patches might be mixed up by the block-based video codec. The goal of color smoothing is to reduce the visible artifacts that appear at patch boundaries.

Figure 5:
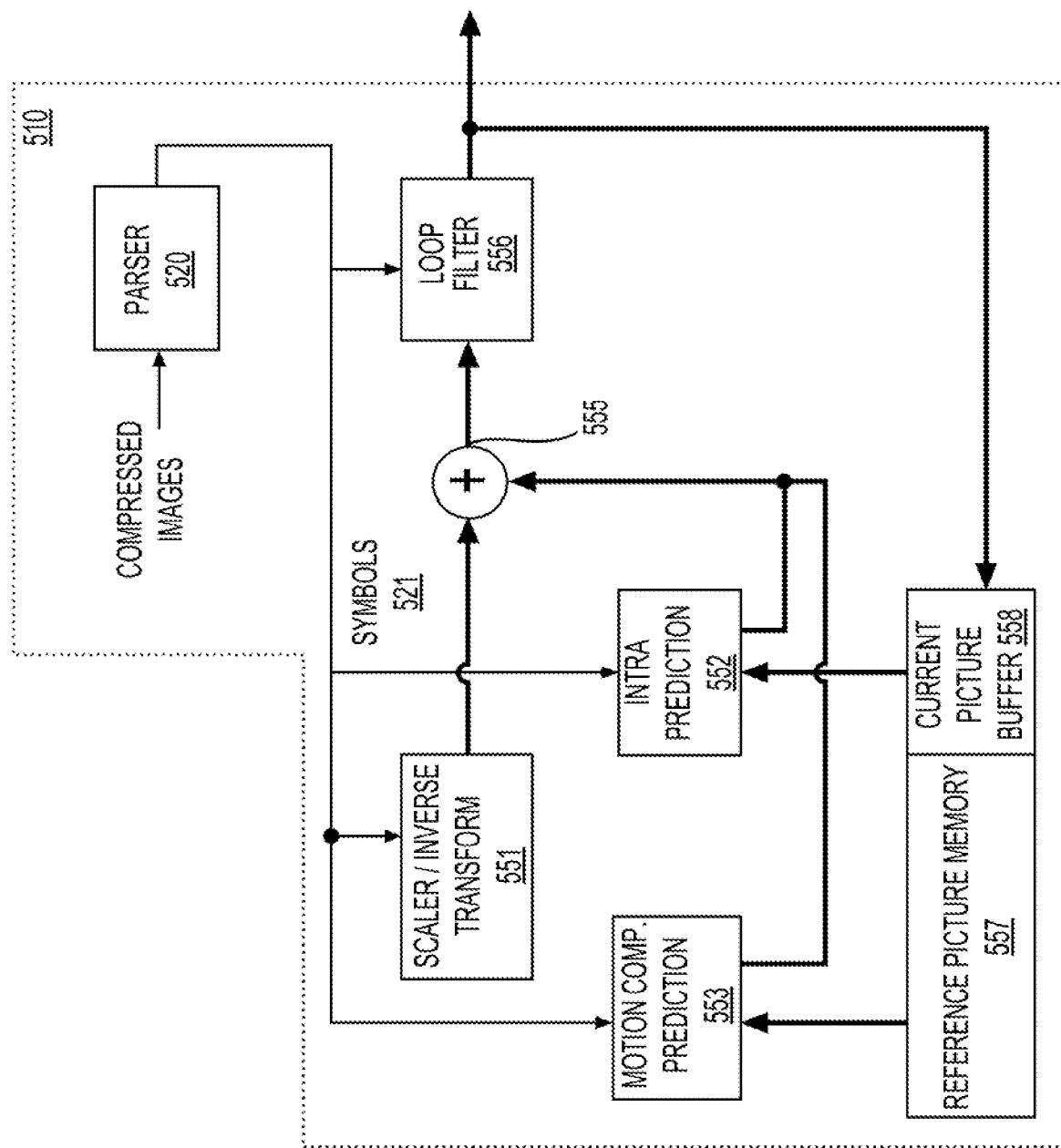
FIG. 5 shows a block diagram of a video decoder in some examples.

FIG. 5 shows a block diagram of a video decoder (510) in some examples. The video decoder (510) can be used in the V-PCC decoder (400). For example, the video decompression modules (434) and (436), the occupancy map decompression module (438) can be similarly configured as the video decoder (510).

The video decoder (510) may include a parser (520) to reconstruct symbols (521) from compressed images, such as the coded video sequence. Categories of those symbols include information used to manage operation of the video decoder (510). The parser (520) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (520) may also extract from the coded video sequence information such as transform coefficients, quantizer parameter values, motion vectors, and so forth.

The parser (520) may perform an entropy decoding/parsing operation on the video sequence received from a buffer memory, so as to create symbols (521).

Reconstruction of the symbols (521) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (520). The flow of such subgroup control information between the parser (520) and the multiple units below is not depicted for clarity.

Beyond the functional blocks already mentioned, the video decoder (510) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (551). The scaler/inverse transform unit (551) receives a quantized transform coefficient as well as control information, including which transform to use, block size, quantization factor, quantization scaling matrices, etc. as symbol(s) (521) from the parser (520). The scaler/inverse transform unit (551) can output blocks comprising sample values that can be input into aggregator (555).

In some cases, the output samples of the scaler/inverse transform (551) can pertain to an intra coded block; that is: a block that is not using predictive information from previously reconstructed pictures, but can use predictive information from previously reconstructed parts of the current picture. Such predictive information can be provided by an intra picture prediction unit (552). In some cases, the intra picture prediction unit (552) generates a block of the same size and shape of the block under reconstruction, using surrounding already reconstructed information fetched from the current picture buffer (558). The current picture buffer (558) buffers, for example, partly reconstructed current picture and/or fully reconstructed current picture. The aggregator (555), in some cases, adds, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated block. In such a case, a motion compensation prediction unit (553) can access reference picture memory (557) to fetch samples used for prediction. After motion compensating the fetched samples in accordance with the symbols (521) pertaining to the block, these samples can be added by the aggregator (555) to the output of the scaler/inverse transform unit (551) (in this case called the residual samples or residual signal) so as to generate output sample information. The addresses within the reference picture memory (557) from where the motion compensation prediction unit (553) fetches prediction samples can be controlled by motion vectors, available to the motion compensation prediction unit (553) in the form of symbols (521) that can have, for example X, Y, and reference picture components. Motion compensation also can include interpolation of sample values as fetched from the reference picture memory (557) when sub-sample exact motion vectors are in use, motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video sequence (also referred to as coded video bitstream) and made available to the loop filter unit (556) as symbols (521) from the parser (520), but can also be responsive to meta-information obtained during the decoding of previous (in decoding order) parts of the coded picture or coded video sequence, as well as responsive to previously reconstructed and loop-filtered sample values.

The output of the loop filter unit (556) can be a sample stream that can be output to a render device as well as stored in the reference picture memory (557) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (520)), the current picture buffer (558) can become a part of the reference picture memory (557), and a fresh current picture buffer can be reallocated before commencing the reconstruction of the following coded picture.

The video decoder (510) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

Figure 6:
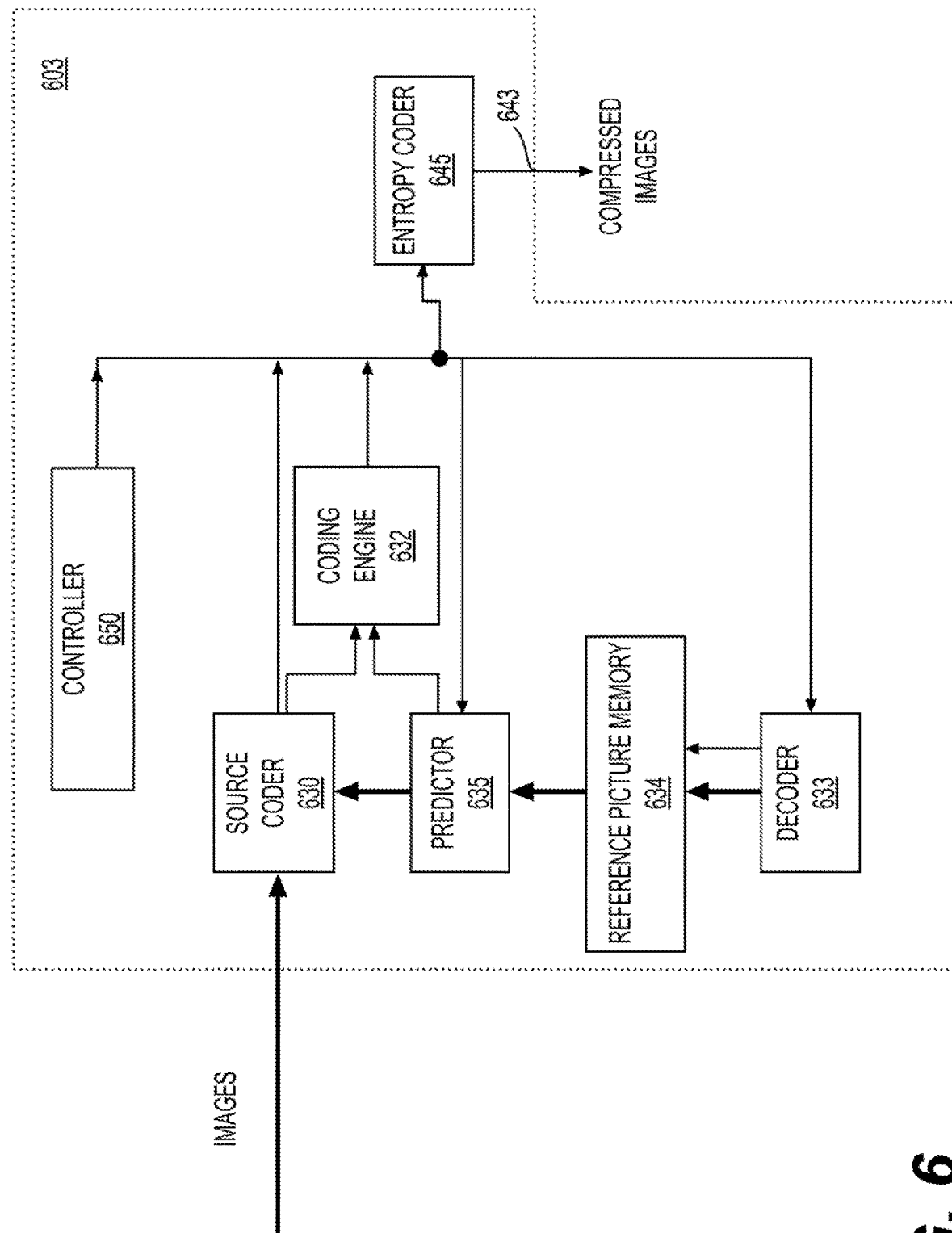
FIG. 6 shows a block diagram of a video encoder in some examples.

FIG. 6 shows a block diagram of a video encoder (603) according to an embodiment of the present disclosure. The video encoder (603) can be used in the V-PCC encoder (300) that compresses point clouds. In an example, the video compression module (322) and (323), and the video compression module (332) are configured similarly to the encoder (603).

The video encoder (603) may receive images, such as padded geometry images, padded texture images and the like, and generate compressed images.

According to an embodiment, the video encoder (603) may code and compress the pictures of the source video sequence (images) into a coded video sequence (compressed images) in real time or under any other time constraints as required by the application. Enforcing appropriate coding speed is one function of a controller (650). In some embodiments, the controller (650) controls other functional units as described below and is functionally coupled to the other functional units. The coupling is not depicted for clarity. Parameters set by the controller (650) can include rate control related parameters (picture skip, quantizer, lambda value of rate-distortion optimization techniques, . . . ), picture size, group of pictures (GOP) layout, maximum motion vector search range, and so forth. The controller (650) can be configured to have other suitable functions that pertain to the video encoder (603) optimized for a certain system design.

In some embodiments, the video encoder (603) is configured to operate in a coding loop. As an oversimplified description, in an example, the coding loop can include a source coder (630) (e.g., responsible for creating symbols, such as a symbol stream, based on an input picture to be coded, and a reference picture(s)), and a (local) decoder (633) embedded in the video encoder (603). The decoder (633) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (634). As the decoding of a symbol stream leads to bit-exact results independent of decoder location (local or remote), the content in the reference picture memory (634) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (633) can be the same as of a "remote" decoder, such as the video decoder (510), which has already been described in detail above in conjunction with FIG. 5. Briefly referring also to FIG. 5, however, as symbols are available and encoding/decoding of symbols to a coded video sequence by an entropy coder (645) and the parser (520) can be lossless, the entropy decoding parts of the video decoder (510), including and parser (520) may not be fully implemented in the local decoder (633).

During operation, in some examples, the source coder (630) may perform motion compensated predictive coding, which codes an input picture predictively with reference to one or more previously-coded picture from the video sequence that were designated as "reference pictures". In this manner, the coding engine (632) codes differences between pixel blocks of an input picture and pixel blocks of reference picture(s) that may be selected as prediction reference(s) to the input picture.

The local video decoder (633) may decode coded video data of pictures that may be designated as reference pictures, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference pictures and may cause reconstructed reference pictures to be stored in the reference picture cache (634). In this manner, the video encoder (603) may store copies of reconstructed reference pictures locally that have common content as the reconstructed reference pictures that will be obtained by a far-end video decoder (absent transmission errors).

The predictor (635) may perform prediction searches for the coding engine (632). That is, for a new picture to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the source coder (630), including, for example, setting of parameters and subgroup parameters used for encoding the video data.

Output of all aforementioned functional units may be subjected to entropy coding in the entropy coder (645). The entropy coder (645) translates the symbols as generated by the various functional units into a coded video sequence, by losslessly compressing the symbols according to technologies such as Huffman coding, variable length coding, arithmetic coding, and so forth.

The controller (650) may manage operation of the video encoder (603). During coding, the controller (650) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (603) may perform coding operations according to a predetermined video coding technology or standard, such as ITU-T Rec. H.265. In its operation, the video encoder (603) may perform various compression operations, including predictive coding operations that exploit temporal and spatial redundancies in the input video sequence. The coded video data, therefore, may conform to a syntax specified by the video coding technology or standard being used.

A video may be in the form of a plurality of source pictures (images) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 7:
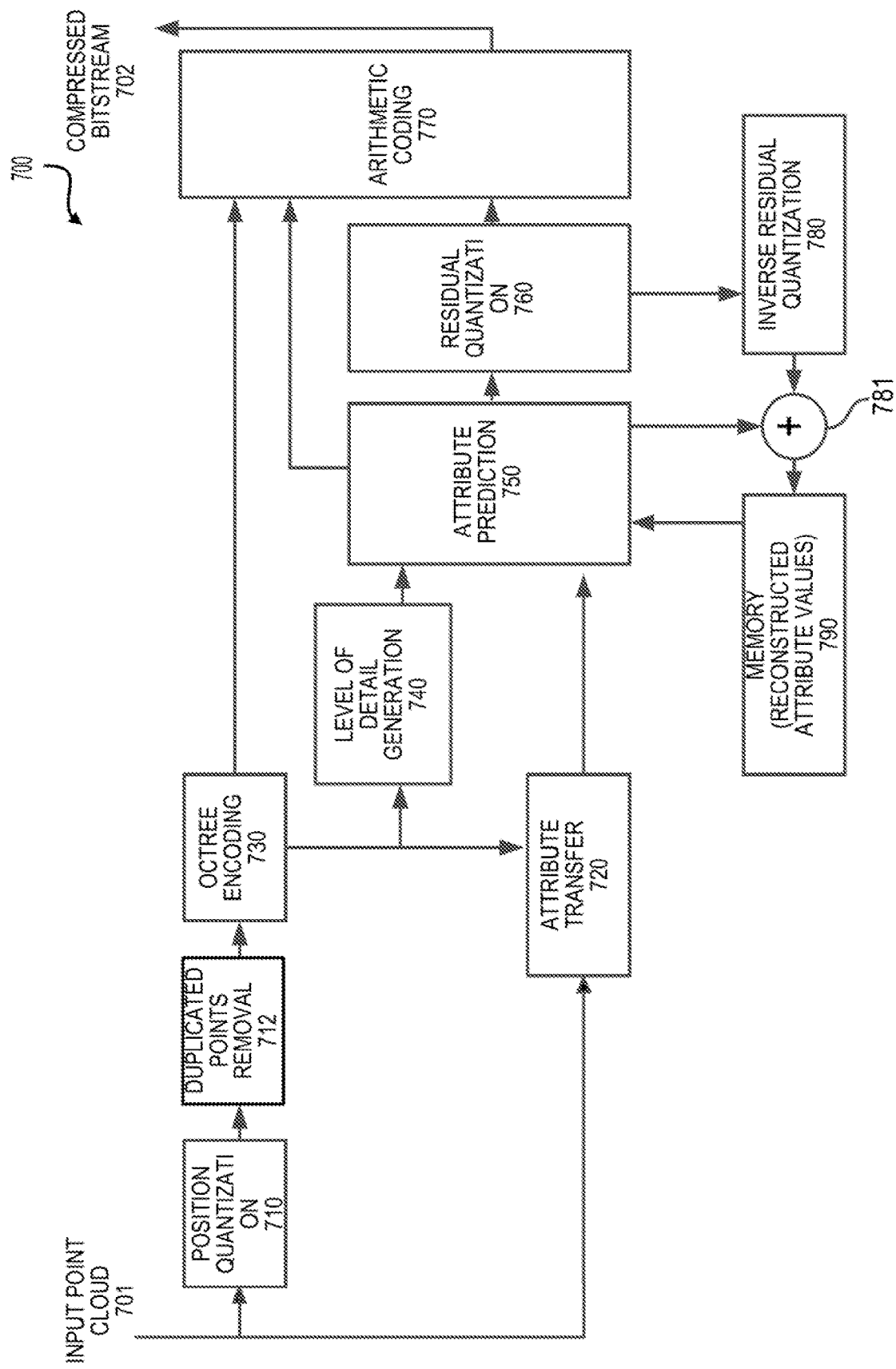
FIG. 7 shows a block diagram of an encoder for encoding point cloud frames in some examples.

FIG. 7 shows a block diagram of a G-PCC encoder (700) in some examples. The G-PCC encoder (700) can be configured to receive point cloud data and compress the point cloud data to generate a bit stream carrying compressed point cloud data. In an embodiment, the G-PCC encoder (700) can include a position quantization module (710), a duplicated points removal module (712), an octree encoding module (730), an attribute transfer module (720), a level of detail (LOD) generation module (740), an attribute prediction module (750), a residual quantization module (760), an arithmetic coding module (770), an inverse residual quantization module (780), an addition module (781), and a memory (790) to store reconstructed attribute values.

As shown, an input point cloud (701) can be received at the G-PCC encoder (700). Positions (e.g., 3D coordinates) of the point cloud (701) are provided to the quantization module (710). The quantization module (710) is configured to quantize the coordinates to generate quantized positions. The duplicated points removal module (712) is configured to receive the quantized positions and perform a filter process to identify and remove duplicated points. The octree encoding module (730) is configured to receive filtered positions from the duplicated points removal module (712), and perform an octree-based encoding process to generate a sequence of occupancy codes that describe a 3D grid of voxels. The occupancy codes are provided to the arithmetic coding module (770).

The attribute transfer module (720) is configured to receive attributes of the input point cloud, and perform an attribute transfer process to determine an attribute value for each voxel when multiple attribute values are associated with the respective voxel. The attribute transfer process can be performed on the re-ordered points output from the octree encoding module (730). The attributes after the transfer operations are provided to the attribute prediction module (750). The LOD generation module (740) is configured to operate on the re-ordered points output from the octree encoding module (730), and re-organize the points into different LODs. LOD information is supplied to the attribute prediction module (750).

The attribute prediction module (750) processes the points according to an LOD-based order indicated by the LOD information from the LOD generation module (740). The attribute prediction module (750) generates an attribute prediction for a current point based on reconstructed attributes of a set of neighboring points of the current point stored in the memory (790). Prediction residuals can subsequently be obtained based on original attribute values received from the attribute transfer module (720) and locally generated attribute predictions. When candidate indices are used in the respective attribute prediction process, an index corresponding to a selected prediction candidate may be provided to the arithmetic coding module (770).

The residual quantization module (760) is configured to receive the prediction residuals from the attribute prediction module (750), and perform quantization to generate quantized residuals. The quantized residuals are provided to the arithmetic coding module (770).

The inverse residual quantization module (780) is configured to receive the quantized residuals from the residual quantization module (760), and generate reconstructed prediction residuals by performing an inverse of the quantization operations performed at the residual quantization module (760). The addition module (781) is configured to receive the reconstructed prediction residuals from the inverse residual quantization module (780), and the respective attribute predictions from the attribute prediction module (750). By combining the reconstructed prediction residuals and the attribute predictions, the reconstructed attribute values are generated and stored to the memory (790).

The arithmetic coding module (770) is configured to receive the occupancy codes, the candidate indices (if used), the quantized residuals (if generated), and other information, and perform entropy encoding to further compress the received values or information. As a result, a compressed bitstream (702) carrying the compressed information can be generated. The bitstream (702) may be transmitted, or otherwise provided, to a decoder that decodes the compressed bitstream, or may be stored in a storage device.

Figure 8:
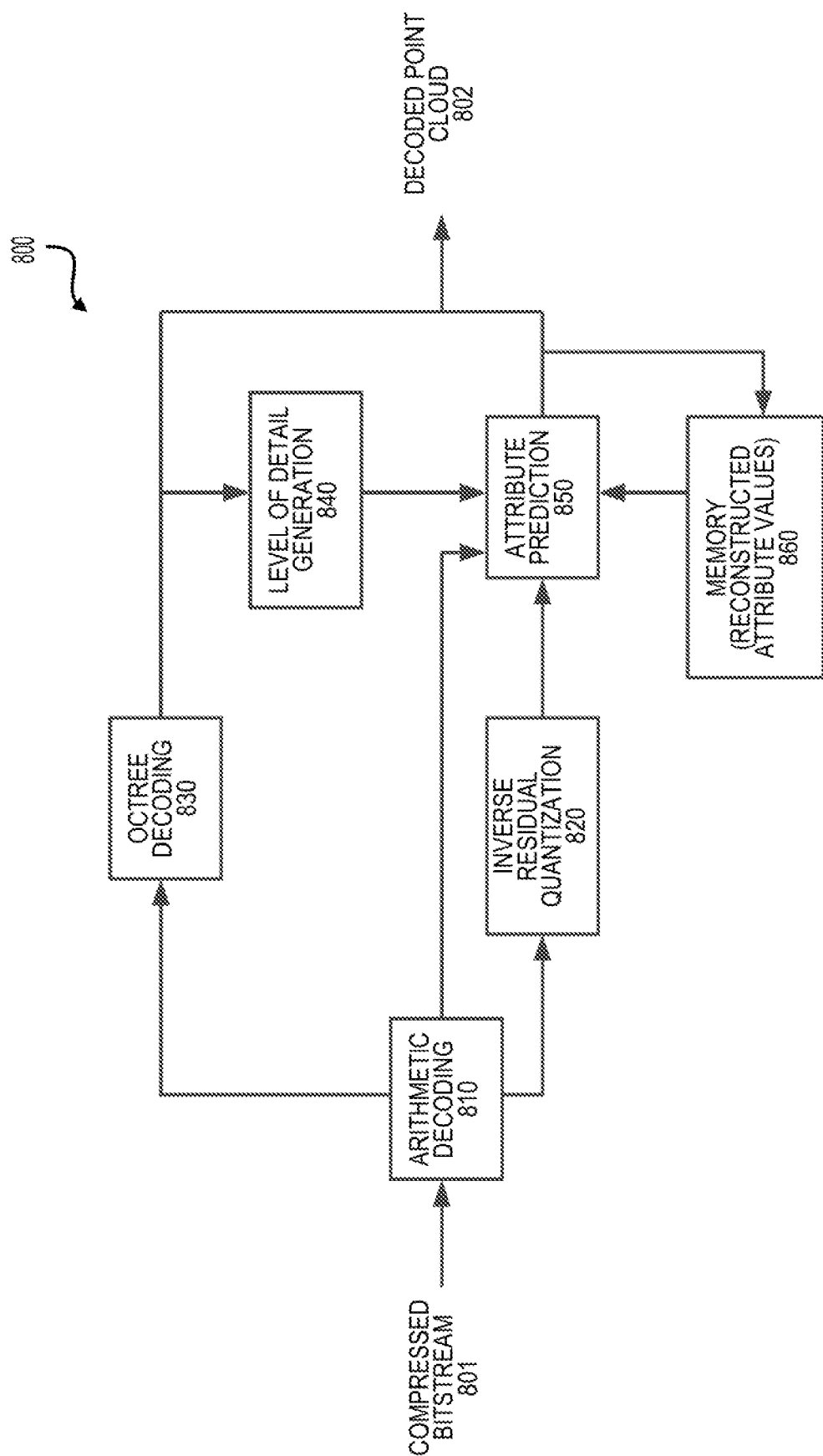
FIG. 8 shows a block diagram of a decoder for decoding a compressed bitstream carrying point cloud frames in some examples.

FIG. 8 shows a block diagram of a G-PCC decoder (800) in accordance with an embodiment. The G-PCC decoder (800) can be configured to receive a compressed bitstream and perform point cloud data decompression to decompress the bitstream to generate decoded point cloud data. In an embodiment, the G-PCC decoder (800) can include an arithmetic decoding module (810), an inverse residual quantization module (820), an octree decoding module (830), an LOD generation module (840), an attribute prediction module (850), and a memory (860) to store reconstructed attribute values.

As shown, a compressed bitstream (801) can be received at the arithmetic decoding module (810). The arithmetic decoding module (810) is configured to decode the compressed bitstream (801) to obtain quantized residuals (if generated) and occupancy codes of a point cloud. The octree decoding module (830) is configured to determine reconstructed positions of points in the point cloud according to the occupancy codes. The LOD generation module (840) is configured to re-organize the points into different LODs based on the reconstructed positions, and determine an LOD-based order. The inverse residual quantization module (820) is configured to generate reconstructed residuals based on the quantized residuals received from the arithmetic decoding module (810).

The attribute prediction module (850) is configured to perform an attribute prediction process to determine attribute predictions for the points according to the LOD-based order. For example, an attribute prediction of a current point can be determined based on reconstructed attribute values of neighboring points of the current point stored in the memory (860). In some examples, the attribute prediction can be combined with a respective reconstructed residual to generate a reconstructed attribute for the current point.

A sequence of reconstructed attributes generated from the attribute prediction module (850) together with the reconstructed positions generated from the octree decoding module (830) corresponds to a decoded point cloud (802) that is output from the G-PCC decoder (800) in one example. In addition, the reconstructed attributes are also stored into the memory (860) and can be subsequently used for deriving attribute predictions for subsequent points.

In various embodiments, the encoder (300), the decoder (400), the encoder (700), and/or the decoder (800) can be implemented with hardware, software, or combination thereof. For example, the encoder (300), the decoder (400), the encoder (700), and/or the decoder (800) can be implemented with processing circuitry such as one or more integrated circuits (ICs) that operate with or without software, such as an application specific integrated circuit (ASIC), field programmable gate array (FPGA), and the like. In another example, the encoder (300), the decoder (400), the encoder (700), and/or the decoder (800) can be implemented as software or firmware including instructions stored in a non-volatile (or non-transitory) computer-readable storage medium. The instructions, when executed by processing circuitry, such as one or more processors, causing the processing circuitry to perform functions of the encoder (300), the decoder (400), the encoder (700), and/or the decoder (800).

It is noted that the attribute prediction modules (750) and (850) configured to implement the attribute prediction techniques disclosed herein can be included in other decoders or encoders that may have similar or different structures from what is shown in FIG. 7 and FIG. 8. In addition, the encoder (700) and decoder (800) can be included in a same device, or separate devices in various examples.

According to some aspects of the disclosure, mesh compression can use coding tools different from PCC coding tools or can use PCC coding tools, such as above PCC (e.g., G-PCC, V-PCC) encoders, above PCC (e.g., G-PCC, V-PCC) decoders, and the like.

A mesh (also referred to as a mesh model, a mesh frame) of an object can include polygons that describe the surface of the object. Each polygon can be defined by vertices of the polygon in 3D space and edges that connect the vertices into the polygon. The information of how the vertices are connected (e.g., information of the edges) is referred to as connectivity information. In some examples, a mesh of an object is formed by connected triangles that describe the surface of the object. Two triangles sharing an edge are referred to as two connected triangles. In some other examples, a mesh of an object is formed by connected quadrilaterals. Two quadrilaterals sharing an edge can be referred to as two connected quadrilaterals. It is noted that meshes can be formed by other suitable polygons.

In some examples, the mesh can also include attributes, such as color, normal, and the like, associated with the vertices. The attributes can be associated with the surface of the mesh by exploiting mapping information that parameterizes the mesh with 2D attribute maps. The mapping information is usually described by a set of parametric coordinates, referred to as UV coordinates or texture coordinates, associated with the mesh vertices. 2D attribute maps (referred to as texture maps in some examples) are used to store high resolution attribute information such as texture, normals, displacements etc. Such information could be used for various purposes such as texture mapping and shading.

In some embodiments, a mesh can include components that are referred to as geometry information, connectivity information, mapping information, vertex attributes, and attribute maps. In some examples, the geometry information is described by a set of 3D positions associated with the vertices of the mesh. In an example, (x,y,z) coordinates can be used to describe the 3D positions of the vertices, and are also referred to as 3D coordinates. In some examples, the connectivity information includes a set of vertex indices that describes how to connect the vertices to create a 3D surface. In some examples, the mapping information describes how to map the mesh surface to 2D regions of the plane. In an example, the mapping information is described by a set of UV parametric/texture coordinates (u,v) associated with the mesh vertices together with the connectivity information. In some examples, the vertex attributes include scalar or vector attribute values associated with the mesh vertices. In some examples, attribute maps include attributes that are associated with the mesh surface and are stored as 2D images/videos. In an example, the mapping between the videos (e.g., 2D images/videos) and the mesh surface is defined by the mapping information.

According to an aspect of the disclosure, some techniques that are referred to as UV mapping or mesh parameterization are used to map surfaces of a mesh in the 3D domain to 2D domain. In some examples, a mesh is partitioned into patches in the 3D domain. A patch is a contiguous subset of the mesh with a boundary formed of boundary edges. A boundary edge of a patch is an edge that belongs to only one polygon of the patch, and is not shared by two adjacent polygons in the patch. Vertices of boundary edges in a patch are referred to as boundary vertices of the patch, and non-boundary vertices in a patch can be referred to as interior vertices of the patch in some examples.

In some examples, a mesh of an object is formed by connected triangles, and the mesh can be partitioned into patches, each patch is a subset of the connected triangles. A boundary edge of a patch is an edge that belongs to only one triangle in the patch and is not shared by adjacent triangles in the patch. Vertices of boundary edges in a patch are referred to as boundary vertices of the patch, and non-boundary vertices in a patch can be referred to as interior vertices of the patch in some examples. A boundary loop includes a sequence of boundary vertices, boundary edges formed by the sequence of boundary vertices can form a loop that is referred to as a boundary loop.

According to an aspect of the disclosure, the patches are parameterized respectively into 2D shapes (also referred to as UV patches) in some examples. The 2D shapes can be packed (e.g., oriented and placed) into maps that are also referred to as atlases in some examples. In some examples, the maps can be further processed using 2D image or video processing techniques.

In an example, a UV mapping technique generates a UV atlas (also referred to as UV map) and one or more texture atlas (also referred to as texture map) in 2D corresponding to patches of a 3D mesh. The UV atlas includes assignments of 3D vertices of the 3D mesh to 2D points in a 2D domain (e.g., a rectangular). The UV atlas is a mapping between coordinates of the 3D surface to coordinates of 2D domain. In an example, a point in the UV atlas at a 2D coordinates (u,v) has a value that is formed by coordinates (x, y, z) of a vertex in the 3D domain. In an example, a texture atlas includes color information of the 3D mesh. For example, a point in the texture atlas at the 2D coordinates (u,v) (which has a 3D value of (x,y,z) in the UV atlas) has a color that specifies the color attribute of a point at (x, y, z) in the 3D domain. In some examples, the coordinates (x, y, z) in the 3D domain are referred to as 3D coordinates, or xyz coordinates, and the 2D coordinates (u,v) are referred to as uv coordinates or UV coordinates.

According to some aspects of the disclosure, mesh compression can be performed by representing a mesh using one or more 2D maps (also referred to as 2D atlas in some examples), and then encoding the 2D maps using image or video codecs. Different techniques can be used to generate the 2D maps.

Figure 9:
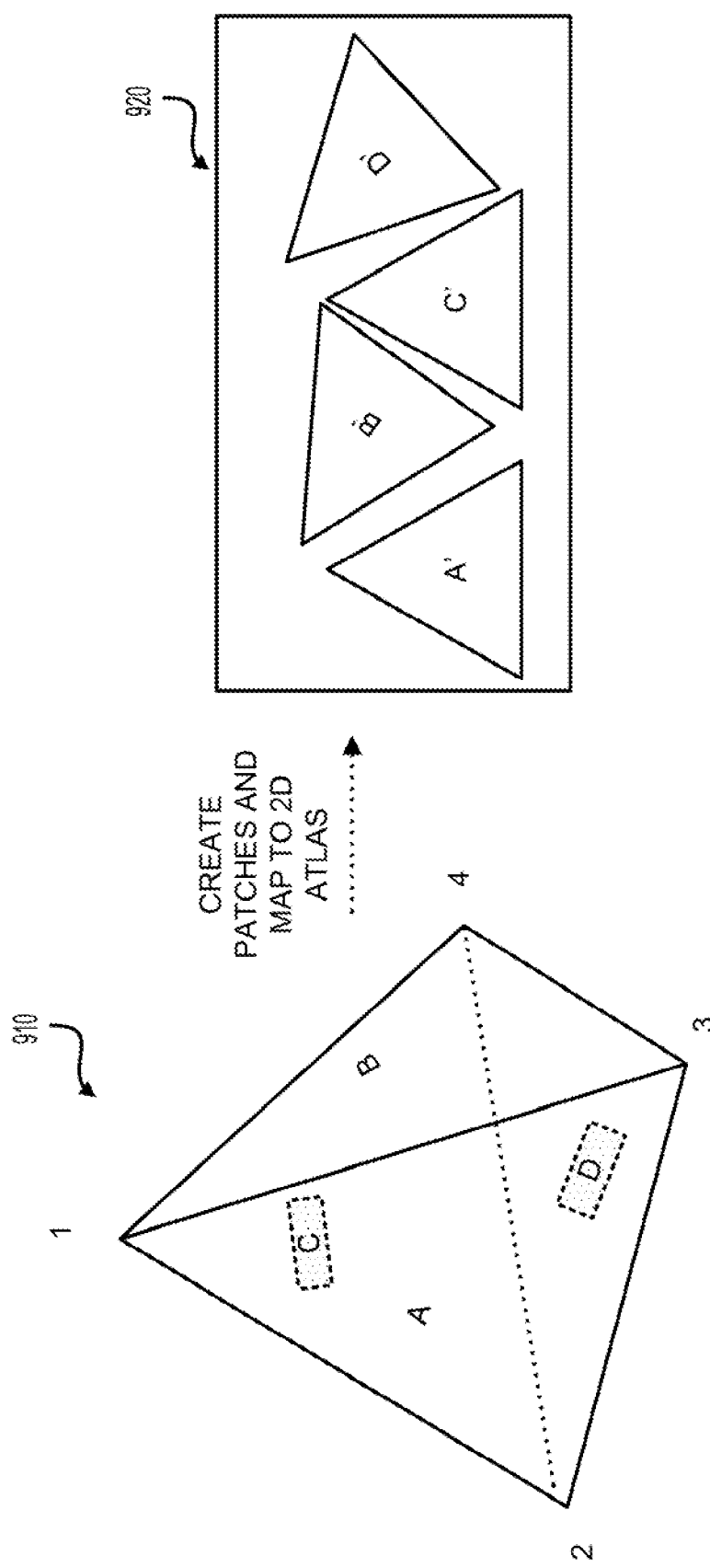
FIG. 9 shows a diagram illustrating a mapping of a mesh to an atlas in some examples.

FIG. 9 shows a diagram illustrating a mapping of a 3D mesh (910) to a 2D atlas (920) in some examples. In FIG. 9 example, the 3D mesh (910) includes four vertices 1-4 that form four patches A-D. Each of the patches has a set of vertices and associated attribute information. For example, the patch A is formed by the vertices 1, 2 and 3 that are connected into a triangle; the patch B is formed by the vertices 1, 3 and 4 that are connected into a triangle; the patch C is formed by the vertices 1, 2 and 4 that are connected into a triangle; and the patch D is formed by the vertices 2, 3 and 4 that are connected into a triangle. In some examples, the vertices 1, 2, 3 and 4 can have respective attributes, and the triangles formed by the vertices 1, 2, 3 and 4 can have respective attributes.

In an example, the patches A, B, C and D in 3D are mapped to a 2D domain, such as the 2D atlas (920) that is also referred to as map (920). For example, the patch A is mapped to a 2D shape (also referred to as UV patch) A' in the map (920), the patch B is mapped to a 2D shape (also referred to as UV patch) B' in the map (920), the patch C is mapped to a 2D shape (also referred to as UV patch) C' in the map (920), and the patch D is mapped to a 2D shape (also referred to as UV patch) D' in the map (920). In some examples, the coordinates in 3D domain are referred to as (x, y, z) coordinates, the coordinates in 2D domain, such as the map (920), are referred to as UV coordinates. A vertex in the 3D mesh can have corresponding UV coordinates in the map (920).

The map (920) can be geometry map with geometry information, or can be texture map with color, normal, textile, or other attribute information, or can be occupancy map with occupancy information.

While each patch is represented by a triangle in the FIG. 9 example, it is noted that a patch can include any suitable number of vertices that are connected to form a contiguous subset of the mesh. In some examples, the vertices in a patch are connected into triangles. It is noted that the vertices in a patch can be connected using other suitable shapes.

In an example, the geometry information of the vertices can be stored into a 2D geometry map. For example, the 2D geometry map stores the (x, y, z) coordinates of sampling points at a corresponding point in the 2D geometry map. For example, a point in the 2D geometry map at (u, v) position has a vector value of 3 components respectively corresponding to the x, y and z values of a corresponding sampling point in the 3D mesh.

According to an aspect of the disclosure, areas in a map may not be fully occupied. For example, in FIG. 9, the areas that are outside the 2D shapes A', B', C' and D' are undefined. The sample values of the areas that are outside the 2D shapes A', B', C' and D' after decoding can be discarded. In some cases, an occupancy map is used to store some extra information for each pixel, such as storing a binary value to identify if a pixel belongs to a patch or is undefined.

According to an aspect of the disclosure, a dynamic mesh is a mesh where at least one of the components (geometry information, connectivity information, mapping information, vertex attributes and attribute maps) varies with time. A dynamic mesh can be described by a sequence of meshes (also referred to as mesh frames). In some examples, mesh frames in a dynamic mesh can be representations of a surface of an object at different time, and each mesh frame is a representation of the surface of the object at a specific time (also referred to as a time instance). The dynamic mesh may require a large amount of data since the dynamic mesh may include a significant amount of information changing over time. Compression technologies of meshes can allow efficient storage and transmission of media contents in the mesh representation.

In some examples, a dynamic mesh can have constant connectivity information, time varying geometry and time varying vertex attributes. In some examples, a dynamic mesh can have time varying connectivity information. In an example, digital content creation tools usually generate dynamic meshes with time varying attribute maps and time varying connectivity information. In some examples, volumetric acquisition techniques are used to generate dynamic meshes. The volumetric acquisition techniques can generate a dynamic mesh with time varying connectivity information especially under real time constraints.

Some techniques are used for mesh compression. In some examples, UV atlas sampling and V-PCC can be used for mesh compression. For example, the UV atlas is sampled on regular grids to generate a geometry image with regular grid samples. Connectivity of the regular grid samples can be inferred. The regular grid samples can be considered as points in a point cloud, and thus can be coded using PCC codec, such as V-PCC codec.

In some other examples, vertex reordering techniques are used for mesh compression. The vertices of a mesh are reordered according to certain rules to increase correlations of neighboring vertices, thus predictive coding methods can be used to increase coding efficiency. In an example, the vertices are reordered to increase correlations of neighboring vertices in a sequence. In another example, vertices of a mesh are reordered and rearranged into a two-dimensional (2D) frame to increase correlations of neighboring vertices in local regions of the 2D frame, thus the 2D frame can be coded more efficiently by image/video codec, such as using intra prediction techniques. In another example, the vertices of different mesh frames are reordered and rearranged in 2D frames to increase correlations between 2D frames, thus the 2D frames can be coded more efficiently by video codec, such as using inter prediction techniques.

FIGS. 10A-10E show an example of using vertex reordering for mesh compression. FIG. 10A shows a diagram of an input mesh (1005) (e.g., original mesh). The input mesh (1005) includes connected triangles that describe a surface of an object. Each triangle is defined by vertices and edges that connect the vertices into the triangle. The input mesh (1005) includes vertices 0 to 8 that are connected into triangles as shown in FIG. 10A.

FIG. 10B shows a diagram of a vertex traversal order (1015) in some examples. The vertex traversal order (1015) is shown by lines with arrows and travers the vertex 0, the vertex 1, the vertex 2, the vertex 3, the vertex 4, the vertex 5, the vertex 6, the vertex 7 and the vertex 8 in a sequence.

Then, the attributes of the vertices, such as the 3D (geometry) coordinates of the vertices, UV coordinates of the vertices, and other attributes of the vertices can be reordered into arrays according to the vertex traversal order (1015). For example, the 3D coordinates of the vertices can be reordered into an array of 3D coordinates in the vertex traversal order (1015), the UV coordinates of the vertices can be reordered into an array of UV coordinates in the vertex traversal order (1015). The arrays can be 1D arrays or can be 2D arrays.

In some examples, the attributes of the vertices are re-ordered and re-shaped according to a raster scan line into a 2D array that form a 2D image. The 2D image can be coded by predictive coding techniques, such as by image or video codec. In an example of a dynamic mesh that includes a sequence of mesh frames, the attributes of the dynamic mesh can be re-ordered to form a sequence of 2D images, and the sequence of 2D images can be coded by a video codec in an example.

FIG. 10C shows a diagram illustrating a raster scan line (1025) that is used to reshape attributes of the vertices into a 2D array (1035). The raster scan line (1025) is shown by lines with arrows. The 2D array (1035) can be also referred to as 2D map or 2D image. In an example, an attribute for a vertex is stored at an entry in the 2D array (1035) corresponding to the vertex, the entry is a pixel in the 2D image, and the attribute value can be considered as the color information of the pixel. In an example, the 2D array (1035) can be a 3D coordinates map. In another example, the 2D array (1035) can be UV coordinate map. The 2D array (1035) can be encoded into a bitstream for carrying the mesh frame.

In some examples, the connectivity information (e.g., how to connect the vertices into edges of triangles) is not explicitly encoded into a bitstream for carrying the mesh frame.

Thus, at a decoder side, the decoder can decode the attributes (e.g., 3D coordinates, uv coordinates, and the like) of the vertices from, for example 2D maps, and reconstruct the vertices.

FIG. 10D shows a diagram illustrating reconstructed vertices 0'-8' in some examples. For example, coordinates (e.g., 3D coordinates, uv coordinates) can be decoded from the bitstream, and then the reconstructed vertices 0'-8' can be generated according to the decoded coordinates.

In some examples, the connectivity information is not explicitly encoded into the bitstream, and edges to connect the reconstructed vertices 0'-8' are inferred according to a connectivity infer rule. The connectivity infer rule can infer connectivity from the decoded 3D coordinates (xyz coordinates) and/or UV coordinates (uv coordinates) on the decoder side. In an example, the connectivity infer rule is suitably established at the decoder side. Once all the vertices are decoded, neighboring vertices are connected according to the connectivity infer rule. The decoder does not need to decode connectivity information from the bitstream.

FIG. 10E shows a diagram illustrating inferred connectivity information (edges) that can connect the reconstructed vertices 0'-8' into triangles to form a reconstructed mesh (1095).

As shown by FIG. 10A and FIG. 10E, the connectivity (edges) of vertices in the reconstructed mesh (1095) can be different from the original input mesh (1005). The connectivity differences can cause the subjective quality of the reconstructed mesh to suffer in some examples. According to another aspect of the disclosure, inferring connectivity at decoder side can take time and consume computation power in terms of complexity.

Aspects of the disclosure provide techniques to explicitly code the connectivity information of a mesh frame in a bitstream that carries the mesh frame. In some examples, connectivity information is provided in the form of polygon faces. Each polygon face is defined by a sequence of vertices that are connected to form edges of the polygon face. In an example, the connectivity information is provided in the form of triangles (also referred to as triangle faces), each triangle is defined by three vertices that are connected to form three edges of the triangle. For example, the mesh connectivity for the input mesh (1005) can include a triangle formed by the vertex 0, the vertex 1 and the vertex 6 in the form of "f v0 v1 v6", where "f" indicates face information, "v0" is an index for the vertex 0, "v1" is an index for the vertex 1, and "v6" is an index for the vertex 6.

According to an aspect of the disclosure, the connectivity information of the mesh frame can be reorganized as respective connectivity attributes of vertices.

According to an aspect of the disclosure, the connectivity attribute of a vertex can be any suitable metric that represents the connectivity information at the vertex. In an example, the connectivity attribute of a vertex includes a valence value that is the number of edges at the vertex. For example, the valence value of vertex 3 in the input mesh (1005) is 3, and the valence value of vertex 5 in the input mesh (1005) is 4, the valence value of vertex 8 in the input mesh (1005) is 6, and so on.

In another example, an algorithm that is referred to as Edgebreaker algorithm can traverse vertices, and mark each vertex with a pattern index to describe how the vertex can connect to some other vertices. For example, the pattern index can identify a connectivity pattern, such as an interior vertex, a boundary vertex, and other patterns. Then, the connectivity attribute of a vertex can include the pattern index marked by the Edgebreaker algorithm.

In some examples, the connectivity attributes of vertices can be reordered and reshaped as other attributes of the vertices, and then can be explicitly coded into the bitstream that carry the mesh.

Figure 11:
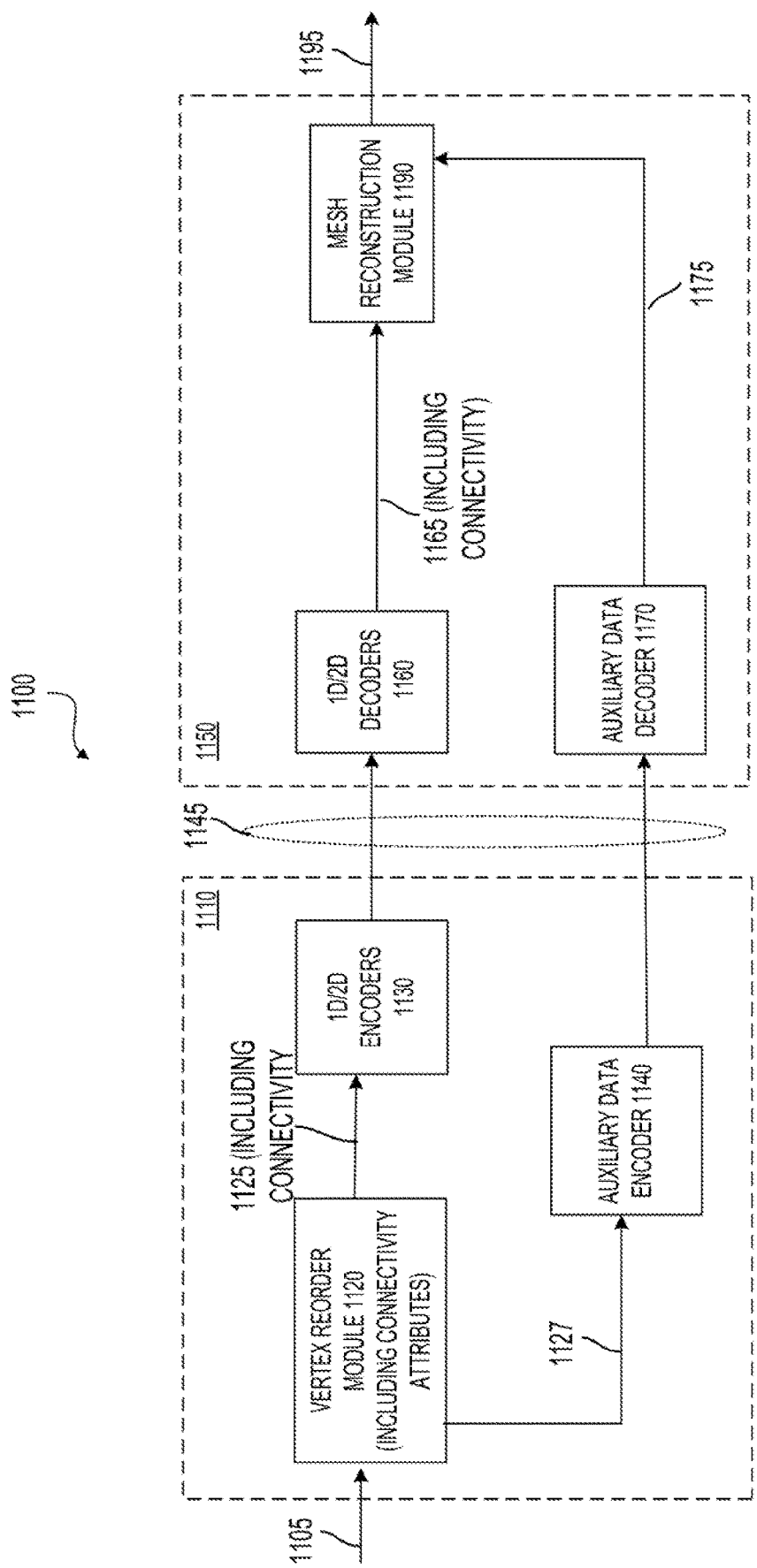
FIG. 11 shows a diagram of a framework for mesh compression according to some embodiments of the disclosure.

FIG. 11 shows a diagram of a framework (1100) for mesh compression according to some embodiments of the disclosure. The framework (1100) includes a mesh encoder (1110) and a mesh decoder (1150). The mesh encoder (1110) encodes an input mesh (1105) (a mesh frame in case of a dynamic mesh processing) into a bitstream (1145), and the mesh decoder (1150) decodes the bitstream (1145) to generate a reconstructed mesh (1195) (a reconstructed mesh frame in case of a dynamic mesh processing).

The mesh encoder (1110) can be any suitable device, such as a computer, a server computer, a desktop computer, a laptop computer, a tablet computer, a smart phone, a gaming device, an AR device, a VR device, and the like. The mesh decoder (1150) can be any suitable device, such as a computer, a client computer, a desktop computer, a laptop computer, a tablet computer, a smart phone, a gaming device, an AR device, a VR device, and the like. The bitstream (1145) can be transmitted from the mesh encoder (1110) to the mesh decoder (1150) via any suitable communication network (not shown).

In the FIG. 11 example, the mesh encoder (1110) includes a vertex reorder module (1120), 1D/2D encoders (1130), and an auxiliary data encoder (1140) coupled together. The vertex reorder module (1120) receives the input mesh (1105) and performs reordering to generate mesh information of reordered vertices (1125). In some examples, the input mesh (1105) includes 3D location information of vertices of a mesh in an original order, connectivity information in the form of polygon faces, mapping information that parameterizes the mesh to 2D (e.g., UV atlas), and other 2D attribute maps (e.g., 2D color map). The vertex reorder module (1120) can determine a vertex traversal order of the vertices, and reorder and/or rearrange the vertices according to the vertex traversal order to increase attribute correlations of neighboring vertices (e.g., attribute correlation of neighboring vertices a sequence (e.g., 1D array), attribute correlations of neighboring vertices in local regions in 2D array, attribute correlation of neighboring frames).

In an example, the vertex reorder module (1120) can reorganize the connectivity information of the mesh frame in the form of respective connectivity attributes (also referred to as original connectivity attributes) of vertices. In an example, the connectivity attribute of each vertex can include a pattern index for indicating a connectivity pattern marked by Edgebreaker algorithm for connectivity compression. In another example, the connectivity attribute of each vertex can include a valence value that indicates the number of edges connected to the vertex.

The vertex reorder module (1120) outputs the mesh information of reordered vertices (1125). The mesh information of reordered vertices (1125) includes vertex information of vertices in the reordered sequence (e.g., 1D). For example, vertex information for each vertex can include various attributes, such as 3D spatial information in the mesh (e.g., xyz coordinates), mapping information to 2D (e.g., uv coordinates), color information (e.g., RGB values), and connectivity attribute.

In another example, the mesh information of reordered vertices (1125) includes vertex information of vertices in the form of 2D images. For example, the reordered vertices are rearranged into samples (pixels) of 2D (e.g., based on raster scan line, and the like), and the mesh information of the reordered vertices can form one or more 2D images, such as a 2D image of 3D coordinates of vertices, a 2D image of UV coordinates of vertices, a 2D image of vertex connectivity attribute, and the like.

The 1D/2D encoders (1130) are configured to encode the mesh information of reordered vertices (1125) into the bitstream (1145). When the mesh information of reordered vertices (1125) includes the vertex information of vertices in the reordered sequence (1D), the 1D/2D encoders (1130) can encode the vertex information of vertices in the reordered sequence using 1D encoding techniques. When the mesh information of reordered vertices (1125) includes 2D images, the 1D/2D encoders (1130) can encode the 2D images using image encoding and/or video encoding techniques (e.g., using image codec or video codec).

The vertex reorder module (1120) also generates auxiliary data (1127) that includes assistance information. The auxiliary data encoder (1140) receives the auxiliary data (1127), and encodes the auxiliary data (1127) into the bitstream (1145). For example, the vertex reorder module (1120) can reorder the vertices patch by patch. The vertex reorder module (1120) can provide values indicating the number of vertices in each patch in the auxiliary data (1127). Further, in an example, the vertex reorder module (1120) can reorder, for each patch, boundary vertices in front of non-boundary vertices. The vertex reorder module (1120) can provide values indicating the number of boundary vertices in each patch in the auxiliary data (1127). In another example, the vertex reorder module (1120) can traverse the vertices according to the Edgebreaker algorithm, and can provide a signal indicative of the Edgebreaker algorithm in the auxiliary data (1127).

In the FIG. 11 example, the bitstream (1145) is provided to the mesh decoder (1150). The mesh decoder (1150) includes 1D/2D decoders (1160), an auxiliary data decoder (1170), and a mesh reconstruction module (1190) coupled together as shown in FIG. 11. In an example, the 1D/2D decoders (1160) correspond the 1D/2D encoders (1130), and can decode a portion of the bitstream (1145) that is encoded by the 1D/2D encoder (1130) and generate decoded information (1165). In an example, the decoded information (1165) includes decoded connectivity attribute map, and other decoded attribute maps, such as decoded 3D coordinate map, decoded uv coordinate map, color map, and the like.

In the FIG. 11 example, the auxiliary data decoder (1170) corresponds to the auxiliary data encoder (1140), and can decode a portion of the bitstream (1145) that is encoded by the auxiliary data encoder (1140) and generate decoded auxiliary data (1175).

In the FIG. 11 example, the decoded information (1165), the decoded auxiliary data (1175) are provided to the mesh reconstruction module (1190). The mesh reconstruction module (1190) generates the reconstructed mesh (1195) based on the decoded information (1165), the decoded auxiliary data (1175).

It is noted that components in the mesh encoder (1110), such as the vertex reorder module (1120), the auxiliary data encoder (1140) and the 1D/2D encoders (1130) can be respectively implemented by various techniques. In an example, a component is implemented by integrated circuitry. In another example, a component is implemented using software that can be executed by one or more processors.

It is noted that components in the mesh decoder (1150), such as the 1D/2D decoders (1160), the auxiliary data decoder (1170), and the mesh reconstruction module (1190), can be respectively implemented by various techniques. In an example, a component is implemented by integrated circuitry. In another example, a component is implemented using software that can be executed by one or more processors.

Figure 12B:
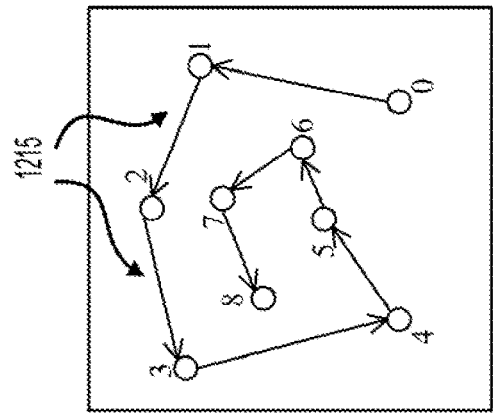
FIGS. 12A-12D show an example of explicitly coding connectivity attributes of a mesh frame according to some embodiments of the disclosure.
Figure 12D:
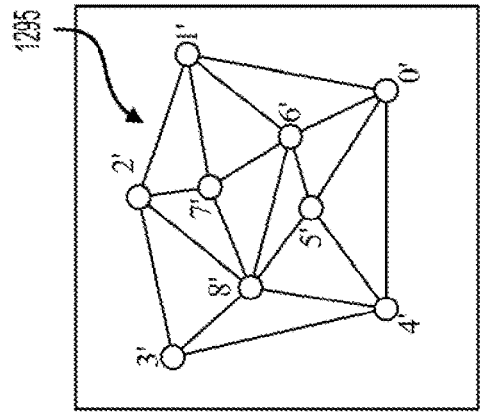
Figure 12A:
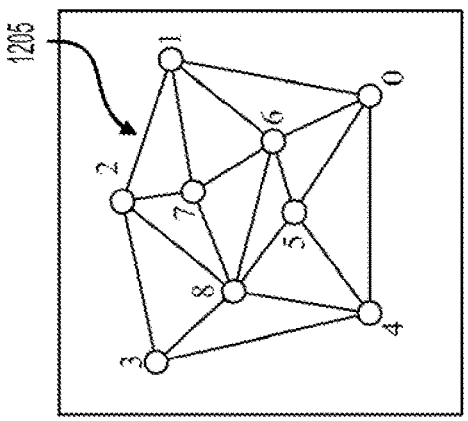

FIGS. 12A-12D show an example of explicitly coding connectivity attributes of a mesh frame in a bitstream that carries the mesh frame according to some embodiments of the disclosure. FIG. 12A shows a diagram of an input mesh (1205). The input mesh (1205) includes connected triangles that describe a surface of an object. Each triangle is defined by vertices and edges that connect the vertices into the triangle. The input mesh (1205) includes vertices 0 to 8 that are connected into triangles as shown in FIG. 12A.

FIG. 12B shows a diagram of a vertex traversal order (1215). The vertex traversal order (1215) is shown by lines with arrows that traverse the vertex 0, the vertex 1, the vertex 2, the vertex 3, the vertex 4, the vertex 5, the vertex 6, the vertex 7 and the vertex 8 in a sequence.

Then, the attributes of the vertices, such as the 3D (geometry) coordinates of the vertices, UV coordinates of the vertices, connectivity attributes of the vertices, and other attributes of the vertices can be reordered into arrays according to the vertex traversal order (1215). For example, the 3D coordinates of the vertices can be reordered into an array of 3D coordinates in the vertex traversal order (1215), the UV coordinates of the vertices can be reordered into an array of UV coordinates in the vertex traversal order (1215), the connectivity attributes of the vertices can be reordered into an array of connectivity attributes in the vertex traversal order (1215). The arrays can be 1D arrays or can be 2D arrays.

In some examples, the attributes of the vertices are re-ordered and re-shaped according to a raster scan line into a 2D array that form a 2D image. The 2D image can be coded by predictive coding techniques, such as by image or video codec. In an example of a dynamic mesh that includes a sequence of mesh frames, the attributes of the dynamic mesh can be re-ordered to form a sequence of 2D images, and the sequence of 2D images can be coded by a video codec in an example.

Figure 12C:
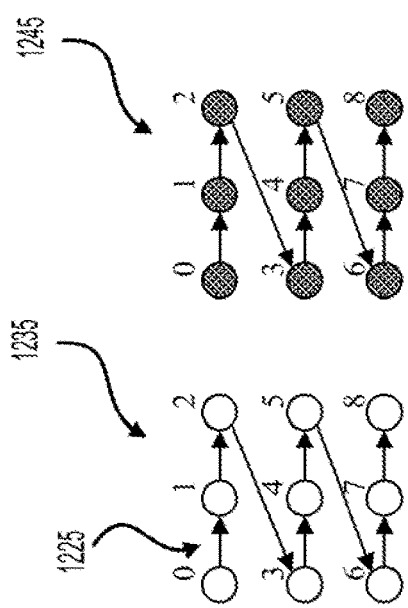

FIG. 12C shows a diagram illustrating a raster scan line (1225) that is used to reshape attributes of the vertices into 2D arrays, such as a 2D array (1245) and a 2D array (1235). The raster scan line (1225) is shown by lines with arrows. The 2D arrays (1235) and (1245) can be also referred to as 2D maps or 2D images. In an example, a connectivity attribute for a vertex is stored at an entry in the 2D array (1245) corresponding to the vertex, the entry is a pixel in the 2D image, and the connectivity attribute is the color information of the pixel. In an example, another attribute, such as 3D coordinates, UV coordinates, and the like for a vertex is stored at an entry in the 2D array (1235) corresponding to the vertex, the entry is a pixel in the 2D image, and the attribute is the color information of the pixel. In an example, the 2D array (1235) can be a 3D coordinates map. In another example, the 2D array (1235) can be UV coordinate map. The 2D array (1235) and the 2D array (1245) can be encoded into a bitstream for carrying the mesh frame.

It is noted that in the FIG. 12C example, the connectivity information (e.g., how to connect the vertices into edges of triangles) is reorganized in the form of connectivity attributes of the vertices, and the connectivity attributes of the vertices are explicitly encoded into a bitstream for carrying the mesh frame. In some examples, the vertices of the original mesh, such as the input mesh (1205) are traversed, and each vertex is marked with either a pattern index or a valence value that can represent the connectivity information of the vertex. For example, the EdgeBreaker algorithm can be used to determine a vertex traversal order, such as the vertex traversal order (1215), to traverse vertices and the EdgeBreaker algorithm can mark each vertex with a pattern index. The connectivity attributes of the vertices can be reordered according to the vertex traversal order, and then shaped into 2D map that is also referred to as a connectivity map denoted by $M_{org}$, such as the 2D array (1245). Each value at a pixel location in the connectivity map (e.g., the 2D array (1245)) is the corresponding pattern index or valence value of a vertex that is reordered and reshaped to the pixel location. Other attributes of the vertices can be reordered according to the vertex traversal order and then shaped into other 2D maps, such as the 2D array (1235). The connectivity map can be coded by any predictive coding methods, such as image codecs, video codecs, and the like. In some examples, the connectivity map can be coded in lossy mode. In some examples, the connectivity map can be coded in lossless mode.

According to an aspect of the disclosure, at a decoder side, the decoder can decode directly from the bitstream that carry the mesh frame, the connectivity attributes of the vertices with other attributes of the vertices. Then, the decoder can reconstruct the mesh frame according to the connectivity attributes of the vertices and other attributes of the vertices.

FIG. 12D shows a diagram illustrating a reconstructed mesh frame (1295). In an example, reconstructed vertices 0'-8' can be reconstructed from, for example, decoded coordinates of the vertices from the bitstream. Then, the reconstructed vertices 0'-8' can be connected according to the decoded connectivity attributes of the vertices from the bitstream, such as valences of the vertices or pattern indexes of the vertices. In an example, the Edgebreaker algorithm can be used to generate the reconstructed mesh frame (1295) according to the pattern indexes of the vertices. In another example, a suitable algorithm is used to generate the reconstructed mesh frame (1295) according to the valences of the vertices. The reconstructed mesh frame (1295) can have the same connectivity information (identical edges) as the original mesh frame (1205).

In some embodiments, the connectivity difference information of a mesh frame can be encoded in a bitstream that carries the mesh frame. The connectivity difference information is the difference between the original connectivity information in the input mesh frame and inferred connectivity information according to a connectivity infer rule.

Figure 13:
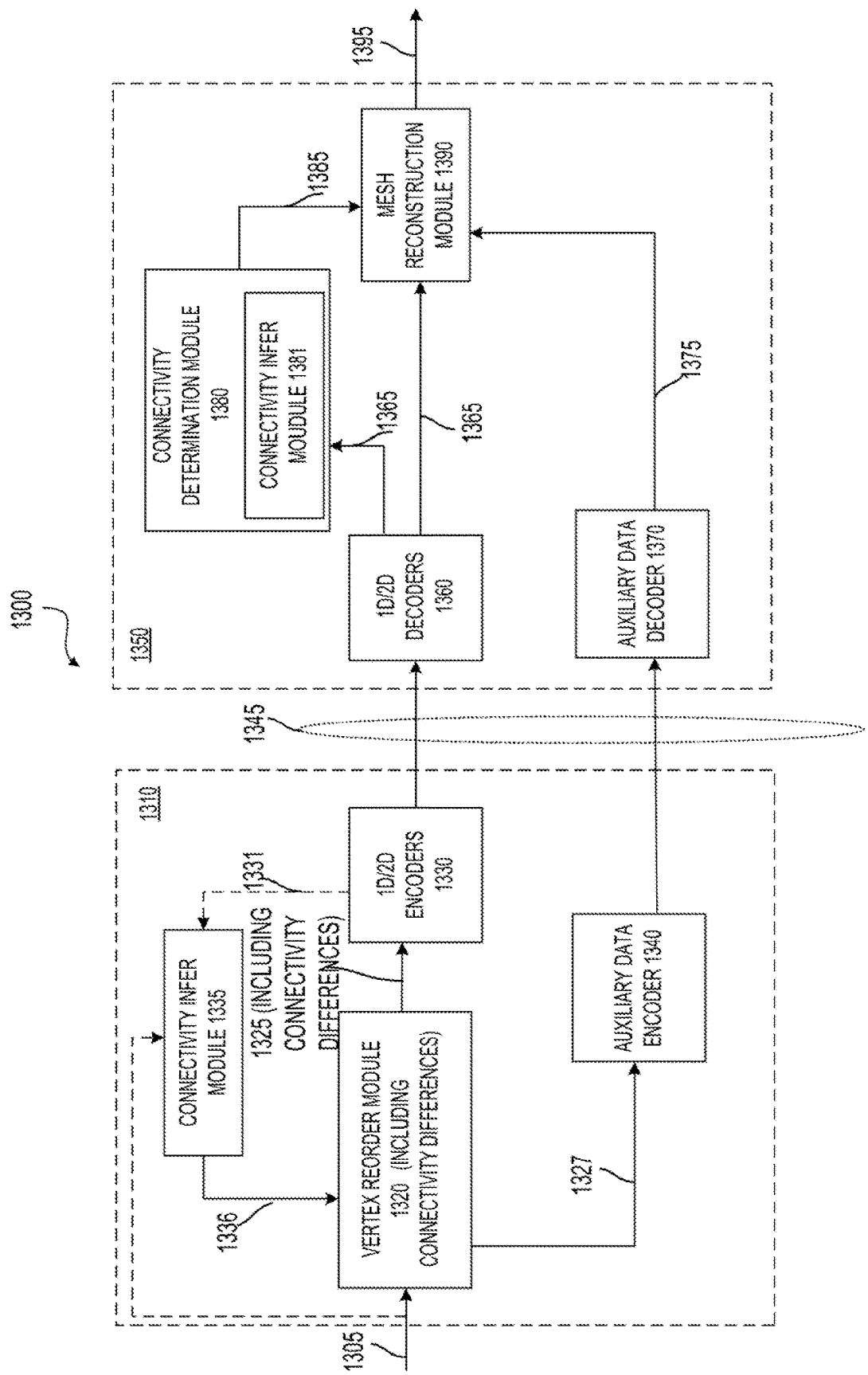
FIG. 13 shows a diagram of a framework for mesh compression according to some embodiments of the disclosure.

FIG. 13 shows a diagram of a framework (1300) for mesh compression according to some embodiments of the disclosure. The framework (1300) includes a mesh encoder (1310) and a mesh decoder (1350). The mesh encoder (1310) encodes an input mesh (1305) (a mesh frame in case of a dynamic mesh processing) into a bitstream (1345), and the mesh decoder (1350) decodes the bitstream (1345) to generate a reconstructed mesh (1395) (a reconstructed mesh frame in case of a dynamic mesh processing).

The mesh encoder (1310) can be any suitable device, such as a computer, a server computer, a desktop computer, a laptop computer, a tablet computer, a smart phone, a gaming device, an AR device, a VR device, and the like. The mesh decoder (1350) can be any suitable device, such as a computer, a client computer, a desktop computer, a laptop computer, a tablet computer, a smart phone, a gaming device, an AR device, a VR device, and the like. The bitstream (1345) can be transmitted from the mesh encoder (1310) to the mesh decoder (1350) via any suitable communication network (not shown).

In the FIG. 13 example, the mesh encoder (1310) includes a vertex reorder module (1320), 1D/2D encoders (1330), an auxiliary data encoder (1340) and a connectivity infer module (1335) coupled together. The vertex reorder module (1320) receives the input mesh (1305) and performs reordering to generate mesh information of reordered vertices (1325) that includes connectivity differences. In some examples, the input mesh (1305) includes 3D location information of vertices of a mesh in an original order, connectivity information in the form of polygon faces, mapping information that parameterizes the mesh to 2D (e.g., UV atlas), and other 2D attribute maps (e.g., 2D color map). The vertex reorder module (1320) can determine a vertex traversal order of the vertices, and reorder and/or rearrange the vertices according to the vertex traversal order to increase attribute correlations of neighboring vertices (e.g., attribute correlation of neighboring vertices a sequence (e.g., 1D array), attribute correlations of neighboring vertices in local regions in 2D array, attribute correlation of neighboring frames).

In an example, the vertex reorder module (1320) can reorganize the connectivity information of the mesh frame in the form of respective connectivity attributes (also referred to as original connectivity attributes) of vertices. In an example, the connectivity attribute of each vertex can include a pattern index for indicating a connectivity pattern marked by Edgebreaker algorithm for connectivity compression. In another example, the connectivity attribute of each vertex can include a valence value that indicates the number of edges connected to the vertex.

The vertex reorder module (1320) outputs the mesh information of reordered vertices (1325). The mesh information of reordered vertices (1325) includes vertex information of vertices in the reordered sequence (e.g., 1D). For example, vertex information for each vertex can include various attributes, such as 3D spatial information in the mesh (e.g., xyz coordinates), mapping information to 2D (e.g., uv coordinates), color information (e.g., RGB values), and connectivity attribute difference (also referred to as connectivity difference) between the original connectivity attribute and an inferred connectivity attribute provided by the connectivity infer module (1335).

In another example, the mesh information of reordered vertices (1325) includes vertex information of vertices in the form of 2D images. For example, the reordered vertices are rearranged into samples (pixels) of 2D (e.g., based on raster scan line, and the like), and the mesh information of the reordered vertices can form one or more 2D images, such as a 2D image of 3D coordinates of vertices, a 2D image of UV coordinates of vertices, a 2D image of vertex connectivity attribute difference, and the like.

The 1D/2D encoders (1330) are configured to encode the mesh information of reordered vertices (1325) into the bitstream (1345). When the mesh information of reordered vertices (1325) includes the vertex information of vertices in the reordered sequence (1D), the 1D/2D encoders (1330) can encode the vertex information of vertices in the reordered sequence using 1D encoding techniques. When the mesh information of reordered vertices (1325) includes 2D images, the 1D/2D encoders (1330) can encode the 2D images using image encoding and/or video encoding techniques (e.g., using image codec or video codec).

In some examples, the connectivity infer module (1335) can generate the inferred connectivity attributes (1336) of vertices based on coordinates of the vertices in the original mesh input (1305). In some examples, the connectivity infer module (1335) can generate the inferred connectivity attributes (1336) of vertices from encoded coordinates of vertices. For example, the connectivity infer module (1335) can receive encoded coordinates of vertices (1331) from the 1D/2D encoders (1330), decode the encoded coordinates of vertices to generate decoded coordinates of vertices (e.g., decoded 3D coordinates, decoded UV coordinates), and generate the inferred connectivity attributes (1336) of vertices according to the decoded coordinates of vertices based on a connectivity infer rule. The connectivity infer module (1335) can provide the inferred connectivity attributes (1336) to the vertex reorder module (1320). The vertex reorder module (1320) can determine connectivity differences of vertices between the original connectivity attributes of vertices and the inferred connectivity attributes of vertices (1336). The vertex reorder module (1320) can reorder the connectivity differences of vertices according to the vertex traversal order to form 1D array or 2D array of connectivity differences. The 1D array or 2D array of connectivity differences is provided to the 1D/2D encoders to encode into the bitstream (1345).

The vertex reorder module (1320) also generates auxiliary data (1327) that includes assistance information. The auxiliary data encoder (1340) receives the auxiliary data (1327), and encodes the auxiliary data (1327) into the bitstream (1345). For example, the vertex reorder module (1320) can reorder the vertices patch by patch. The vertex reorder module (1320) can provide values indicating the number of vertices in each patch in the auxiliary data (1327). Further, in an example, the vertex reorder module (1320) can reorder, for each patch, boundary vertices in front of non-boundary vertices. The vertex reorder module (1320) can provide values indicating the number of boundary vertices in each patch in the auxiliary data (1327). In another example, the vertex reorder module (1320) can traverse the vertices according to the Edgebreaker algorithm, and can provide a signal indicative of the Edgebreaker algorithm in the auxiliary data (1327). In another example, multiple connectivity infer rules can be used to infer connectivity attributes, and a signal indicating a selection of a specific connectivity infer rule from the multiple connectivity infer rules can be included in the auxiliary data (1327).

In the FIG. 13 example, the bitstream (1345) is provided to the mesh decoder (1350). The mesh decoder (1350) includes 1D/2D decoders (1360), an auxiliary data decoder (1370), a connectivity determination module (1380), and a mesh reconstruction module (1390) coupled together as shown in FIG. 13. In an example, the 1D/2D decoders (1360) correspond the 1D/2D encoders (1330), and can decode a portion of the bitstream (1345) that is encoded by the 1D/2D encoder (1330) and generate decoded information (1365). The decoded information (1365) includes decoded coordinates information, such as decoded 3D coordinate map, decoded UV coordinate map and the like, decoded connectivity differences (e.g., decoded connectivity difference map), other decoded attribute information (e.g., decoded color map, and the like)

In the FIG. 13 example, the auxiliary data decoder (1370) corresponds the auxiliary data encoder (1340), and can decode a portion of the bitstream (1345) that is encoded by the auxiliary data encoder (1340) and generate decoded auxiliary data (1375).

In the FIG. 13 example, the connectivity determination module (1380) can receive the decoded information (1365), such as the decoded coordinates of vertices (e.g., decoded 3D coordinates, decoded uv coordinates and the like) and the decoded connectivity differences of vertices, and generate recovered connectivity attributes (1385). In an example, the connectivity determination module (1380) includes a connectivity infer module (1381). The connectivity infer module (1381) operates similar to the connectivity infer module (1335), can generate inferred connectivity attributes according to the decoded coordinates of vertices based on a connectivity infer rule. It is noted that, in an example, the same connectivity infer rule is used in the connectivity infer module (1335) and the connectivity infer module (1381). The connectivity determination module (1380) combines the inferred connectivity attributes of vertices output from the connectivity infer module (1381) with the decoded connectivity differences of vertices to generate the recovered connectivity attributes (1385) of vertices.

In the FIG. 13 example, the decoded information (1365), the decoded auxiliary data (1375) and the recovered connectivity attributes of vertices (1385) are provided to the mesh reconstruction module (1390). The mesh reconstruction module (1390) generates the reconstructed mesh (1395) based on the decoded information (1365), the decoded auxiliary data (1375) and the recovered connectivity attributes of vertices (1385).

It is noted that components in the mesh encoder (1310), such as the vertex reorder module (1320), the auxiliary data encoder (1340), the 1D/2D encoders (1330) and the connectivity infer module (1335) can be respectively implemented by various techniques. In an example, a component is implemented by integrated circuitry. In another example, a component is implemented using software that can be executed by one or more processors.

It is noted that components in the mesh decoder (1350), such as the 1D/2D decoders (1360), the auxiliary data decoder (1370), the connectivity determination module (1380), and the mesh reconstruction module (1390), can be respectively implemented by various techniques. In an example, a component is implemented by integrated circuitry. In another example, a component is implemented using software that can be executed by one or more processors.

Figure 14A:
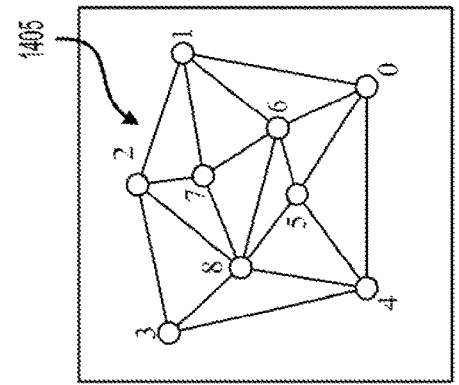
FIGS. 14A-14F show an example of coding connectivity differences of a mesh frame according to some embodiments of the disclosure.

FIGS. 14A-14F show an example of coding connectivity differences of vertices in a mesh frame into a bitstream that carries the mesh frame according to some embodiments. FIG. 14A shows a diagram of an input mesh (1405). The input mesh (1405) includes connected triangles that describe a surface of an object. Each triangle is defined by vertices and edges that connect the vertices into the triangle. The input mesh (1405) includes vertices 0 to 8 that are connected into triangles as shown in FIG. 14A.

Figure 14B:
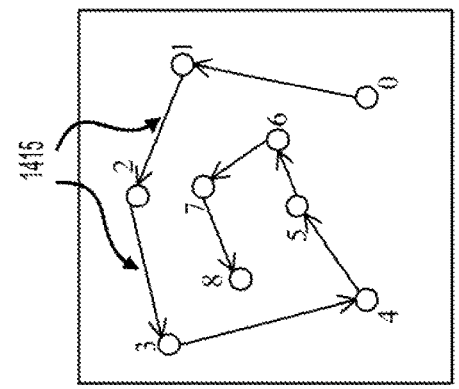

FIG. 14B shows a diagram of a vertex traversal order (1415) in some examples. The vertex traversal order (1415) is shown by lines with arrows that travers the vertex 0, the vertex 1, the vertex 2, the vertex 3, the vertex 4, the vertex 5, the vertex 6, the vertex 7 and the vertex 8 in a sequence.

Then, the attributes of the vertices, such as the 3D (geometry) coordinates of the vertices, UV coordinates of the vertices, and other attributes of the vertices can be reordered into arrays according to the vertex traversal order (1415). For example, the 3D coordinates of the vertices can be reordered into an array of 3D coordinates in the vertex traversal order (1415), the UV coordinates of the vertices can be reordered into an array of UV coordinates in the vertex traversal order (1415). The arrays can be 1D arrays or can be 2D arrays.

In some examples, the connectivity information (e.g., how to connect the vertices into edges of triangles) of the original mesh frame (1405) is reorganized in the form of original connectivity attributes of the vertices. In some examples, the vertices of the original mesh, such as the input mesh (1405)

are traversed, and each vertex is marked with either a pattern index or a valence value that can represent the connectivity attributes of the vertex. For example, the EdgeBreaker algorithm can be used to determine a vertex traversal order, such as the vertex traversal order (1415), to traverse vertices and the EdgeBreaker algorithm can mark each vertex with a pattern index. The connectivity attributes of the vertices can be reordered according to the vertex traversal order, and then shaped into 2D map that is also referred to as an original connectivity map denoted by $M_{org}$. Each value at a pixel location in the connectivity map is the corresponding pattern index or valence value of a vertex that is reordered and reshaped to the pixel location.

At the encoder side, in some examples, the encoder generates inferred connectivity attributes according to a connectivity infer rule.

Figure 14C:
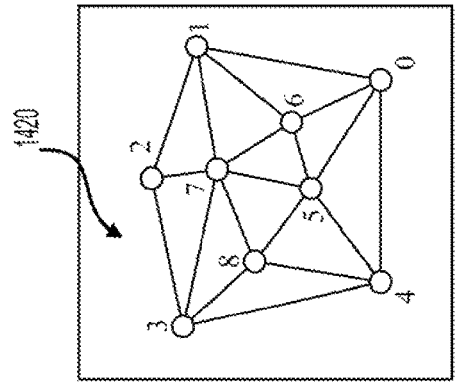

FIG. 14C shows inferred connectivity (1420) for the vertices 1-8 for example based on the locations of the vertices according to a connectivity infer rule. The inferred connectivity (1420) can be in the form of inferred connectivity attributes of vertices. In some examples, the inferred connectivity attributes of the vertices can be reordered according to the vertex traversal order, and then shaped into 2D map that is also referred to as an inferred connectivity map denoted by $M_{infer}$. Each value at a pixel location in the inferred connectivity map is the corresponding inferred pattern index or inferred valence value of a vertex that is reordered and reshaped to the pixel location.

According to an aspect of the disclosure, the difference between the original connectivity map $M_{org}$ and the inferred connectivity map $M_{infer}$ can be calculated to determine a connectivity difference map that is denoted by $M_{diff}$, for example using $M_{diff} = M_{org} - M_{infer}$. Each value at a pixel location in the connectivity difference map $M_{diff}$ is a difference value between pixel values at the same pixel location in the original connectivity map and the inferred connectivity map.

In some examples, the attributes of the vertices are re-ordered and re-shaped according to a raster scan line into a 2D array that form a 2D image. The 2D image can be coded by predictive coding techniques, such as by image or video codec. In an example of a dynamic mesh that includes a sequence of mesh frames, the attributes of the dynamic mesh can be re-ordered to form a sequence of 2D images, and the sequence of 2D images can be coded by a video codec in an example.

Figure 14D:
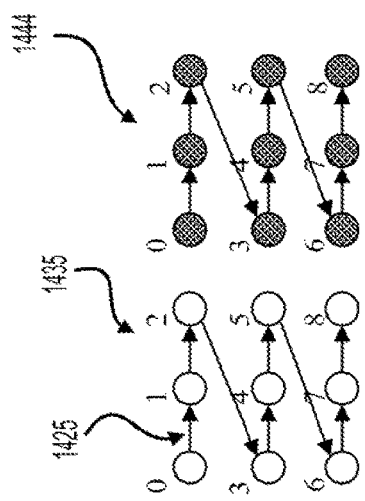

FIG. 14D shows a diagram illustrating a raster scan line (1425) that is used to reshape attributes of the vertices into 2D arrays, such as a 2D array (1444) and a 2D array (1435). The raster scan line (1425) is shown by lines with arrows. The 2D arrays (1435) and (1444) can be also referred to as 2D maps or 2D images. In an example, the 2D array (1444) is the connectivity difference map $M_{diff}$. A connectivity difference for a vertex is stored at an entry in the 2D array (1444) corresponding to the vertex, the entry is a pixel in the 2D image, and the connectivity difference is the color information of the pixel. In an example, another attribute, such as 3D coordinates, UV coordinates, and the like for a vertex is stored at an entry in the 2D array (1435) corresponding to the vertex, the entry is a pixel in the 2D image, and the attribute is the color information of the pixel. In an example, the 2D array (1435) can be a 3D coordinates map. In another example, the 2D array (1435) can be UV coordinate map. The 2D array (1435) and the 2D array (1444) can be encoded into a bitstream for carrying the mesh frame.

Figure 14E:
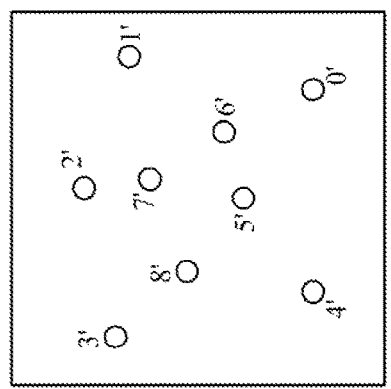

FIG. 14E shows a diagram illustrating reconstructed vertices 0'-8' in some examples. For example, coordinates can be decoded from the bitstream, and then the reconstructed vertices 0'-8' can be generated according to the decoded coordinates.

In some examples, edges to connect the reconstructed vertices 0'-8' are inferred according to a connectivity infer rule. The connectivity infer rule can infer connectivity from the decoded 3D coordinates (xyz coordinates) and/or UV coordinates (uv coordinates) on the decoder side. According to an aspect of the disclosure, the same connectivity infer rule is used at the encoder side and the decoder side. In some examples, the connectivity infer rule is used to generate the inferred connectivity attributes (1420) of vertices at the encoder side. At the decoder side, the same connectivity infer rule is used to connect the reconstructed vertices 0'-8' in FIG. 14E, and generate the inferred connectivity attributes of vertices, for example in the form of an inferred connectivity map denoted by $M'_{infer}$. The inferred connectivity map $M'_{infer}$ can be identical to the inferred connectivity map $M_{infer}$ obtained according to the description of FIG. 14C.

The decoder also decodes connectivity differences of vertices from the bitstream, in example in the form of a decoded connectivity difference map denoted by $M'_{diff}$. In an example, the decoded connectivity difference map $M'_{diff}$ and the inferred connectivity map $M'_{infer}$ can be added to obtain recovered connectivity map $M_{recover}$ that includes recovered connectivity attributes of vertices. The recovered connectivity map $M_{recover}$ can be identical to the connectivity map $M_{org}$ of the original input mesh (1405), and can be used to reconstruct mesh.

Figure 14F:
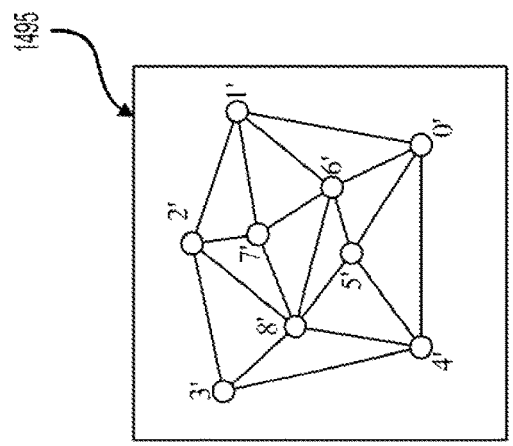

FIG. 14F shows a diagram illustrating a reconstructed mesh (1495). The reconstructed mesh includes the reconstructed vertices 0'-8', and the reconstructed vertices 0'-8' are connected according to the recovered connectivity map $M_{recover}$. In some examples, the reconstructed mesh (1495) can be identical to the original input mesh (1405) with the same connectivity.

According to an aspect of the disclosure, at the encoder side, the encoder can use different connectivity infer rules (also referred to as different connectivity infer methods) to infer more than one connectivity maps. Then, one of the connectivity infer rules that has the best inferred connectivity map compared with the original connectivity map (e.g., with minimum error) is selected by the encoder and an index indicating the selection is signaled in the bitstream to let the decoder know which connectivity infer rule is selected.

Some aspects of the disclosure provide techniques to code connectivity information of a mesh (also referred to as mesh frame), such as connectivity differences between original connectivity information of the mesh and inferred connectivity information of the mesh, in a bitstream that carries the compressed mesh. At the decoder side, a decoder can decode, from the bitstream, the signaled connectivity information, such as the connectivity differences. The decoder can generate inferred connectivity information according to an agreed rule shared by the encoder and the decoder, and can combine the connectivity differences with the inferred connectivity information. By using the received connectivity information and inferred connectivity information, the final connectivity information among vertices can be recovered.

According to some aspects of the disclosure, the connectivity information, such as the connectivity differences, can be represented in association with vertices or can be represented in association with edges.

According to an aspect of the disclosure, the connectivity information, such as connectivity differences, can be represented by listing each vertex's connected vertices.

In some embodiments, at both encoder side and decoder side, the entire set of vertices are ordered and each vertex is assigned with a unique index number. At the encoder side, the encoder can compare the original connectivity and inferred connectivity (also referred to as derived connectivity), and the indices of the vertices that have different connectivity between the original connectivity and the inferred connectivity are signaled, followed by the difference information that can be used to correct the inferred connectivity information for the vertices.

In some examples, for each vertex Vi (i=1, 2, . . . ), the vertices that the vertex Vi connects to are referred to as Vi(1), Vi(2), . . . Vi(Ci), where Ci is the number of vertices the vertex Vi connects to. For different vertices, Ci may be different. In an example, the number of connections each vertex has can be signaled as well.

Figure 15:
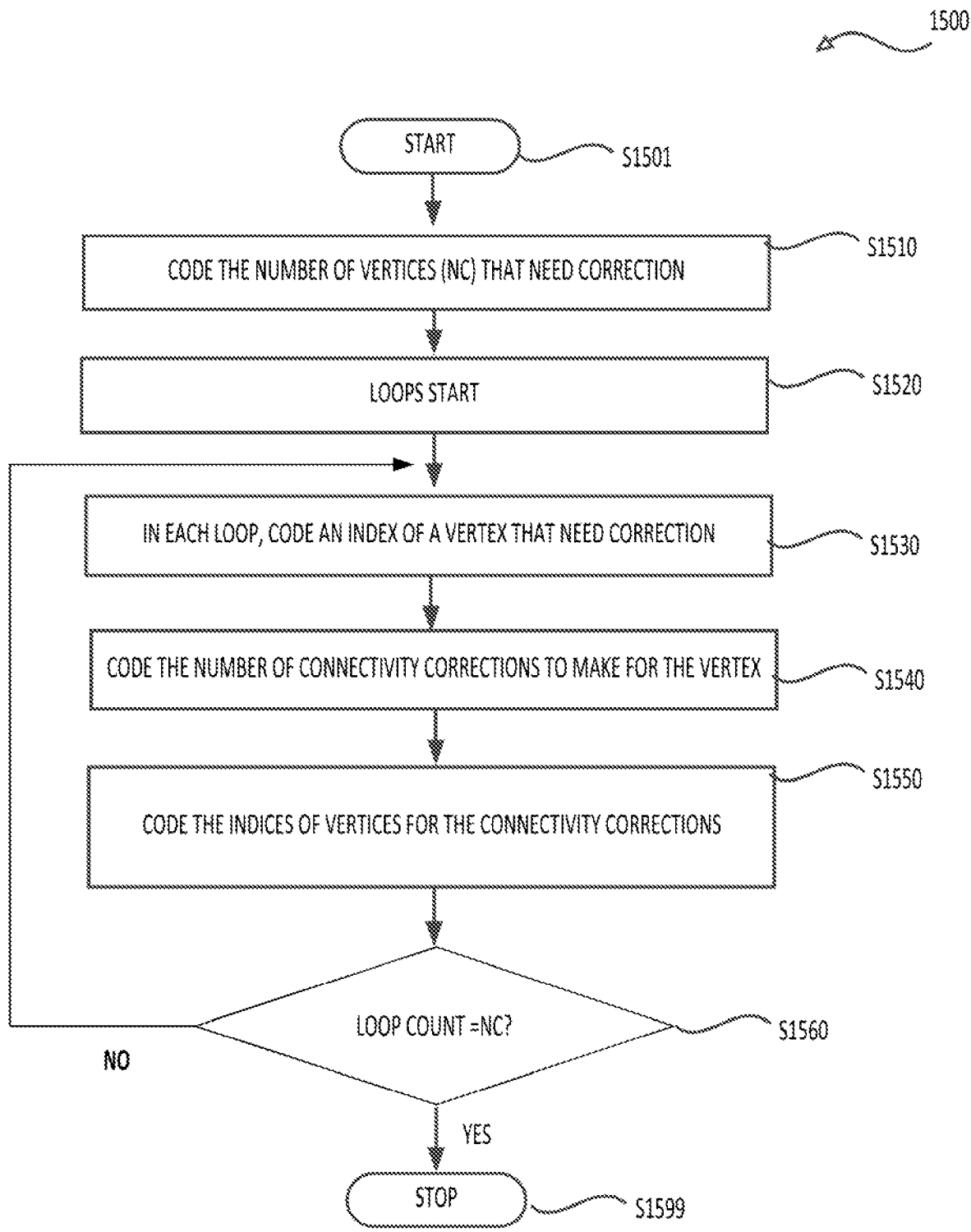
FIG. 15 shows a flow chart outlining a process example in some examples.

FIG. 15 shows a flow chart outlining a process (1500) for coding the connectivity differences in associated with vertices in some examples. In an example, the process (1500) is executed at the encoder side to signal the connectivity differences by vertices. The process (1500) starts at (S1501) and proceeds to (S1510).

At (S1510), the number of vertices that need connectivity correction is signaled. The number of vertices that need connectivity correction can be denoted by NC. Then, the coding of the connectivity differences is performed by loops of processing respectively for the vertices that need connectivity correction. Each loop of processing can be used to code the connectivity differences for one vertex.

At (S1520), the loops start. Each loop includes processing from (S1530) to (S1550).

At (S1530), for a current vertex in a current loop, the index of the current vertex that has connection information to be corrected is signaled.

At (S1540), a value indicating the number of corrections the current vertex needs to make is signaled. In an example, the number of corrections is positive for the vertices that need connectivity correction, thus the value to signal can be the number of corrections minus 1.

At (S1550), the connectivity differences for the current vertex are signaled. In some examples, the connectivity differences can include a first set of indices of vertices that the current vertex should be connected to (in the original connectivity) but not in the inferred connectivity, and a second set of indices of vertices that the current vertex should not be connected to (not in the original connectivity) but in the inferred connectivity.

For example, based on the inferred connectivity, the current vertex Vx connects to m (m is a positive integer) different vertices, Vi1, Vi2, Vi3 . . . , Vim. According to the original connectivity, the current vertex Vx should not connect to the vertices Vi2 and Vi3, and the current vertex Vx should additionally connect to Vy (not in the inferred connectivity). The first set of indices of vertices includes Vy, and the second set of indices of vertices includes Vi2 and Vi3. Thus, in an example, the number of connectivity corrections the current vertex should make is 3 (e.g., 2 is signaled in an example). Further, the indices of the vertices to be signaled can be Vi2, Vi3, Vy.

In some examples, at the decoder side, after deriving the connectivity of the vertex Vx, a first connection of Vx-Vi2 and a second connection of Vx-Vi3 are removed and an additional connection of Vx and Vy is added into the connectivity of the vertex Vx.

At (S1560), when the number of loops (loop count) is equal to the number of vertices that need correction, the process proceeds to (S1599) and terminates; otherwise, the process returns to (S1530) and proceeds to a next loop.

It is noted that an edge is built by connecting two vertices together, thus when a correction is related to an edge (adding an edge or removing an edge), the correction can be performed with one of the two vertices. For example, when a correction is done on Vx (to connect with Vy), then the corresponding correction on Vy (to connect with Vx) is not necessary.

In some examples, the indices of vertices that need correction can be predictively coded. For example, at (S1540), multiple vertices may need to be signaled, a first vertex has a first index and a second vertex has a second index. In an example, to signal the indices of the vertices, after signaling the first index of the first vertex, a difference between the second index and the first index can be coded, instead of signaling the absolute value of the second index.

In some embodiments, a specific rule that derives the inferred connectivity of vertices in a vertex-by-vertex manner (one vertex at a time for a sequence of vertices) is used at both the encoder side and the decoder side. After deriving the connected vertices for a current vertex Vi, a flag can be used to indicate if any correction needs to be made. If the flag indicates yes (exists correction to make), index (or indices) of one or more vertices that need to be corrected can be signaled. For existing connected vertices in the inferred connectivity of the current vertex Vi, being signaled means the connection(s) of the current vertex Vi to the signaled vertices should be removed; for not connected vertices in the inferred connectivity of the current vertex Vi, being signaled means connections of the signaled vertices to the current vertex Vi should be added to the connectivity information associated with the current vertex Vi.

In some examples, a quadrilateral includes two pairs of diagonal vertices. One of the two pairs diagonal vertices can be connected to divide the quadrilateral into a pair of triangles, but not both pairs of diagonal vertices are allowed. When one pair of diagonal vertices is connected, the other pair of diagonal vertices should not be connected. Therefore, correcting a connection of a pair of diagonal vertices in a quadrilateral can infer the other pair of unconnected diagonal vertices should be connected, and vice versa.

For example, in FIG. 14C, vertices 5, 6, 7 and 8 form a quadrilateral. In FIG. 14C, the inferred connectivity includes a connection of vertex 5 and vertex 7 that divides the quadrilateral into 2 triangles. For the current vertex 5, the connectivity differences include the connection of vertex 5 and the vertex 7, and the index of the vertex 7 is signaled to indicate a correction to make. In response to the index of the vertex 7 for the current vertex 5, the connection of the vertex 5 and the vertex 7 can be removed. Further, a connection of the vertex 6 and the vertex 8 can be added simultaneously without signaling.

According to another aspect of the disclosure, connectivity differences can be signaled based on edges. For example, when the inferred connectivity does not include an edge, signaling a pair of vertices of the edge can indicate a correction to connect the pair of vertices to form the edge; on the other hand, when the inferred connectivity includes an edge, signaling a pair of vertices of the edge can indicate a correction to remove the edge to disconnect the two pair of vertices.

For example, in FIG. 14C, vertices 5, 6, 7 and 8 form a quadrilateral. In FIG. 14C, the inferred connectivity includes an edge formed by a connection of vertex 5 and vertex 7 that divides the quadrilateral into 2 triangles. The edge formed by the vertex 5 and the vertex 7 is not in the original connectivity information. In an example, the connectivity differences can include a signaling of the pair of currently connected vertex 5 and vertex 7 to indicate a correction to make. At the decoder side, in response to the signaling of the pair of currently connected vertex 5 and vertex 7, the edge of the vertex 5 and the vertex 7 is removed, and another edge of the vertex 6 and the vertex 8 is added simultaneously without signaling the other edge. In another example, the connectivity differences can include a signaling of a pair of currently unconnected vertex 6 and vertex 8 to indicate a correction to make. At the decoder side, in response to the signaling of a pair of currently unconnected vertex 6 and vertex 8, the edge of the vertex 6 and the vertex 8 is added, and another edge of the vertex 5 and vertex 7 is removed simultaneously without signaling the other edge.

It is noted that the signaling of the indices of vertices for an edge can be coded in a predictive way. For example, an edge is formed by a first vertex and a second vertex, the first vertex has a first index and the second vertex has a second index. In an example, the first index (e.g., the smaller one of the first index and the second index) is signaled and a difference between the second index and the first index is signaled to indicate the two vertices of the edge.

According to another aspect of the disclosure, the connectivity information, such as the connectivity differences, can be represented based on valence values of vertices.

In some examples, given valence values for all the vertices in a mesh, a unique connectivity map can be derived based on the given valence values. Therefore, when correct valence values for all the vertices (same valence values for vertices as in the original mesh at the encoder side) are available at the decoder side, the inferred connectivity can be derived to be the same as the original connectivity of the original mesh.

In some examples, at both encoder side and decoder side, the entire set of vertices are ordered and assigned with a unique index number. At the encoder side, the indices of the vertices that have different valence values between the original connectivity and the inferred connectivity (using a given connectivity derivation algorithm, referred to as DA) are signaled, followed by the valence differences that can be used to correct the valences for the vertices. At the decoder side, based on the connectivity derivation algorithm (using the same connectivity derivation algorithm as the encoder side, referred to as DA), each vertex can have an inferred valence value. After all the valence values of the vertices are corrected according to the signaled valence differences and to become the same as in the original mesh, the connectivity information can be correctly derived.

According to another aspect of the disclosure, the connectivity information, such as the connectivity difference, can be signaled in a per edge basis. In some examples, for each edge in the inferred connectivity for a mesh, a flag can be signaled to indicate whether the edge exists in the original mesh or not. In an example, the edges in the inferred connectivity can be suitably ordered. For example, each edge is ordered based on a first vertex of the two vertices of the edge with a lower index and then a second vertex of the two vertices of the edge with a higher index. The flags of the edges in the inferred connectivity can be organized according to the ordered edges and then signaled, thus the indices of the vertices of the edges are not need to be signaled. At the decoder side, when a flag for an edge in the inferred connectivity indicates yes, the decoder can keep the edge; otherwise, the edge can be removed. In some examples, the flags can be signaled by arithmetic coding with some context information from the coded bitstream.

Further, for each edge that is not in the inferred connectivity but is in the original mesh, the edge can be signaled by two vertex indices of the edge, such that the decoder can recover the edge. The two vertex indices can be signaled by predictive coding as well. For example, the smaller index of the two vertex indices is signaled, and then a difference between the two vertex indices is signaled.

Figure 16:
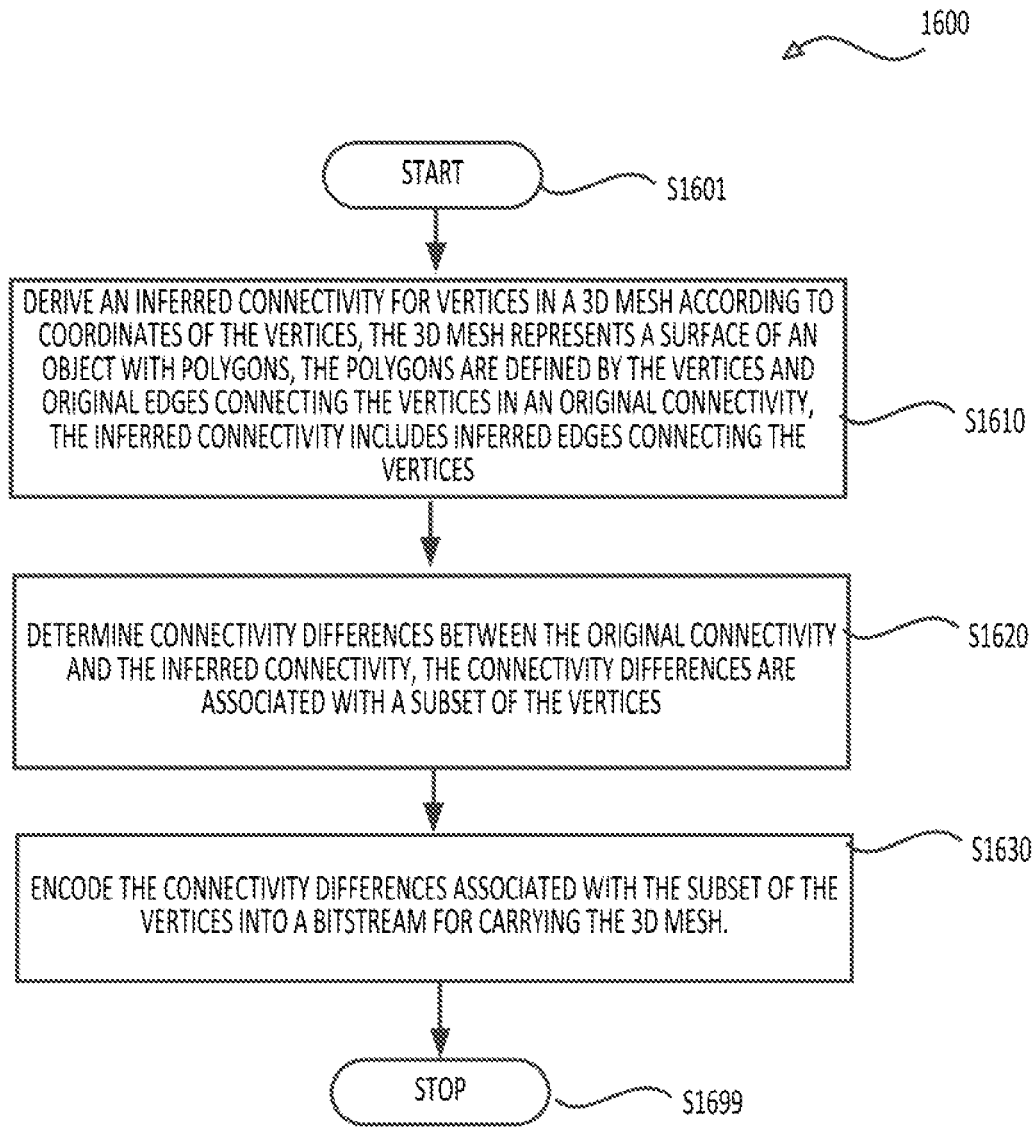
FIG. 16 shows a flow chart outlining a process example in some examples.

FIG. 16 shows a flow chart outlining a process (1600) according to an embodiment of the disclosure. The process (1600) can be used during an encoding process for a mesh. In various embodiments, the process (1600) is executed by processing circuitry. In some embodiments, the process (1600) is implemented in software instructions, thus when the processing circuitry executes the software instructions, the processing circuitry performs the process (1600). The process starts at (S1601) and proceeds to (S1610).

At (S1610), an inferred connectivity for vertices in a 3D mesh is derived according to coordinates (e.g., 3D coordinates and/or UV coordinates) of the vertices. The 3D mesh represents a surface of an object with polygons, the polygons are defined by the vertices and an original connectivity having original edges connecting the vertices. The inferred connectivity includes inferred edges connecting the vertices.

At (S1620), connectivity differences between the original connectivity and the inferred connectivity are determined. The connectivity differences are associated with a subset of the vertices.

At (S1630), the connectivity differences associated with the subset of the vertices are encoded into a bitstream for carrying the 3D mesh.

In some examples, to encode the connectivity difference, a first value indicating a number of vertices in the subset of the vertices is encoded into the bitstream. To encode connectivity differences associated with a first vertex in the subset of the vertices, a first index for the first vertex is encoded into the bitstream, and a second value indicating a number of connectivity corrections associated with the first vertex is encoded into the bitstream. Further, a sequence of indices indicating a set of vertices respectively corresponding to the connectivity corrections associated with the first vertex is encoded into the bitstream.

In some examples, to encode a sequence of indices associated with the first vertex, a first signal corresponding a second index for a second vertex is coded in the bitstream, and a second signal corresponding to a difference between the second index and a third index for a third vertex is encoded into the bitstream.

In some examples, the inferred connectivity is generated vertex by vertex. In an example, for a first vertex, a first set of vertices that is connected with the first vertex in the inferred connectivity is derived. Then, a flag associated with the first vertex is encoded into the bitstream. The flag indicates whether one or more connectivity corrections are associated with the first vertex. In response to the flag indicating one or more connectivity corrections associated with the first vertex, a sequence of indices is encoded into the bitstream. The sequence of indices indicates a second set of vertices respectively corresponding to the one or more connectivity corrections associated with the first vertex.

In some examples, to encode the connectivity differences for a first vertex in the subset of the vertices, an index of the first vertex is encoded into the bitstream, and a valence difference between a first valence of the first vertex in the original connectivity and a second valence of the first vertex in the inferred connectivity is encoded into the bitstream.

According to an aspect of the disclosure, a connectivity correction generally changes connectivity at two vertices, but can be executed at one of the two vertices. In an example, for a connectivity correction, one of the two vertices is selected to signal the connectivity correction.

According to another aspect of the disclosure, a connectivity correction of a first pair of diagonal vertices in a quadrilateral also indicates another connectivity correction of a second pair of diagonal vertices in the quadrilateral. Thus, in an example, for connectivity corrections in a quadrilateral, one of the two connectivity corrections of the two pairs of diagonal vertices is selected and signaled in the bitstream.

Then, the process proceeds to (S1699) and terminates.

The process (1600) can be suitably adapted. Step(s) in the process (1600) can be modified and/or omitted. Additional step(s) can be added. Any suitable order of implementation can be used.

Figure 17:
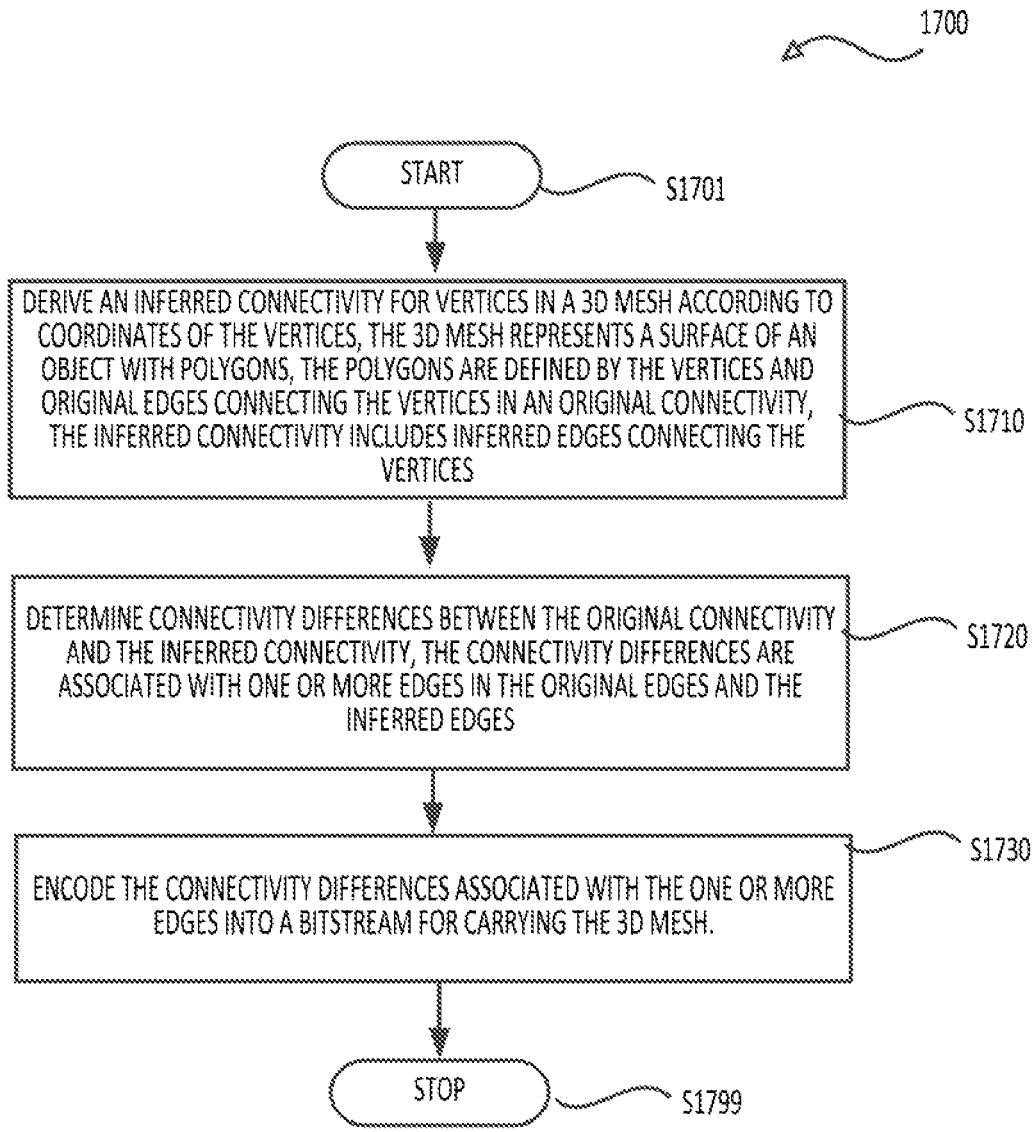
FIG. 17 shows a flow chart outlining a process example in some examples.

FIG. 17 shows a flow chart outlining a process (1700) according to an embodiment of the disclosure. The process (1700) can be used during an encoding process for a mesh. In various embodiments, the process (1700) is executed by processing circuitry. In some embodiments, the process (1700) is implemented in software instructions, thus when the processing circuitry executes the software instructions, the processing circuitry performs the process (1700). The process starts at (S1701) and proceeds to (S1710).

At (S1710), an inferred connectivity for vertices in a 3D mesh is derived according to coordinates (3D coordinates and/or UV coordinates) of the vertices. The 3D mesh represents a surface of an object with polygons, the polygons are defined by the vertices and an original connectivity having original edges connecting the vertices. The inferred connectivity includes inferred edges connecting the vertices.

At (S1720), connectivity differences between the original connectivity and the inferred connectivity are determined. the connectivity differences are associated with one or more edges in the original edges and the inferred edges.

At (S1730), the connectivity differences associated with the one or more edges are encoded into a bitstream for carrying the 3D mesh.

In some examples, to indicate a first edge in the one or more edges in the original edges and the inferred edges, signals indicating a first vertex and a second vertex of the first edge are encoded in the bitstream. In an example, a first value corresponding to a first index of the first vertex is encoded and a second value corresponding to a difference between the first index and a second index for the second vertex is encoded into the bitstream.

In some examples, flags respectively associated with the inferred edges are encoded into the bitstream. A flag associated with an inferred edge indicates whether the inferred edge exists in the original edges. In some examples, the inferred edges can be suitably ordered and the flags can be encoded according to the order of the inferred edges.

According to another aspect of the disclosure, a connectivity correction of a first pair of diagonal vertices in a quadrilateral also indicates another connectivity correction of a second pair of diagonal vertices in the quadrilateral. Thus, in an example, for connectivity corrections in a quadrilateral, one of the two connectivity corrections of the two pairs of diagonal vertices is selected and signaled in the bitstream.

Then, the process proceeds to (S1799) and terminates.

The process (1700) can be suitably adapted. Step(s) in the process (1700) can be modified and/or omitted. Additional step(s) can be added. Any suitable order of implementation can be used.

Figure 18:
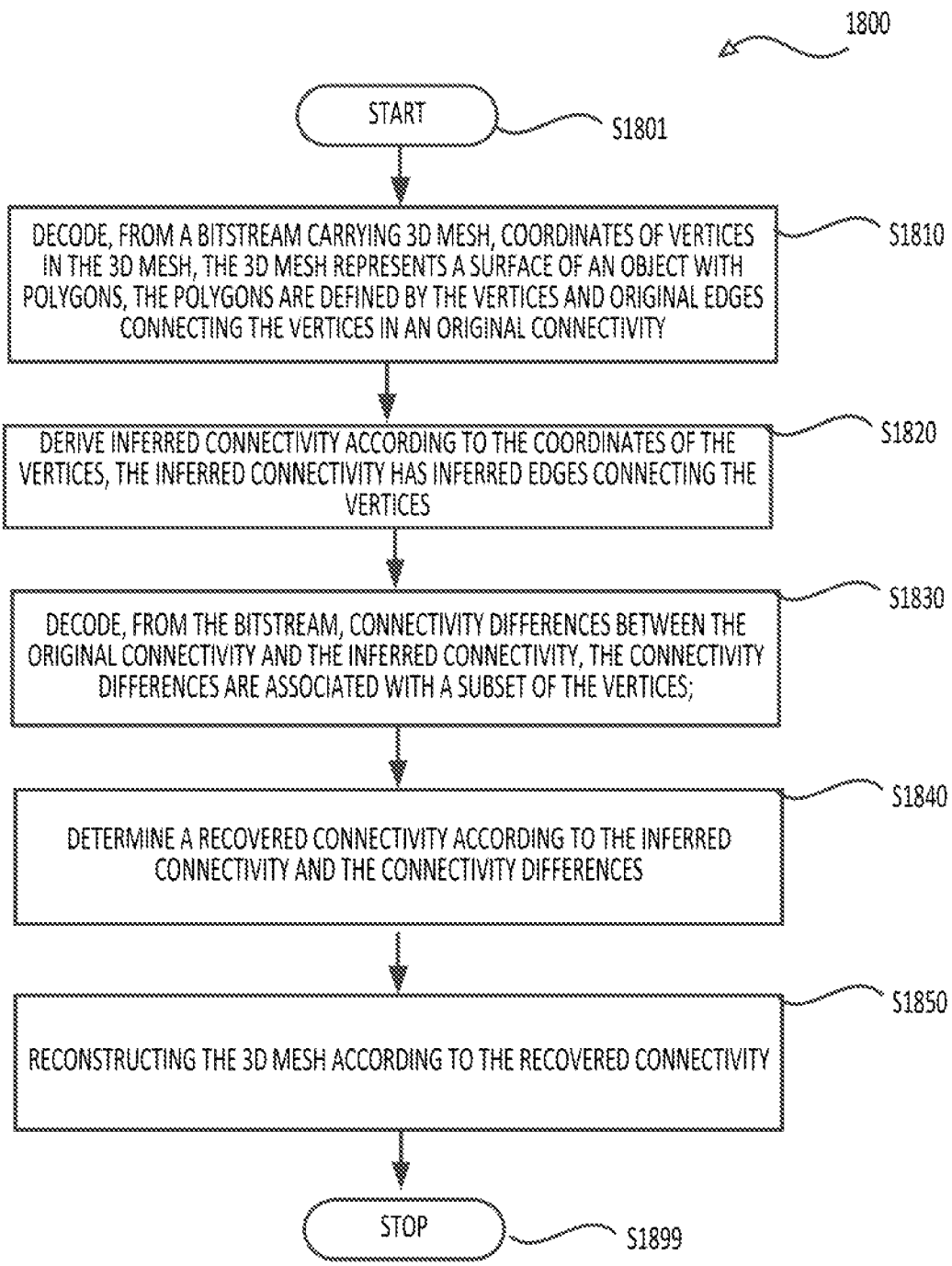
FIG. 18 shows a flow chart outlining a process example in some examples.

FIG. 18 shows a flow chart outlining a process (1800) according to an embodiment of the disclosure. The process (1800) can be used during a decoding process for a mesh. In various embodiments, the process (1800) is executed by processing circuitry. In some embodiments, the process (1800) is implemented in software instructions, thus when the processing circuitry executes the software instructions, the processing circuitry performs the process (1800). The process starts at (S1801) and proceeds to (S1810).

At (S1810), from a bitstream carrying a 3D mesh, coordinates (e.g., 3D coordinates and/or UV coordinates) of vertices in the 3D mesh are decoded. The 3D mesh represents a surface of an object with polygons, the polygons are defined by the vertices and an original connectivity having original edges connecting the vertices.

At (S1820) an inferred connectivity having inferred edges connecting the vertices is derived according to the coordinates of the vertices.

At (S1830), connectivity differences associated with a subset of the vertices are decoded from the bitstream.

At (S1840) a recovered connectivity is determined according to the inferred connectivity and the connectivity differences.

At (S1850), the 3D mesh is reconstructed according to the recovered connectivity.

In some examples, to decode the connectivity differences, a first value indicating a number of vertices in the subset of the vertices is decoded from the bitstream. Then, loops of decoding are executed according to the number of vertices in the subset of the vertices, and each loop of decoding is for decoding connectivity differences associated with a vertex in the subset of the vertices.

In some examples, in a loop of decoding, a first index for a first vertex in the subset of the vertices is decoded. Then, a second value indicating a number of connectivity corrections associated with the first vertex is decoded from the bitstream. Further, a sequence of indices indicating a set of vertices respectively corresponding to the connectivity corrections is decoded from the bitstream.

In some examples, to determine the recovered connectivity, a second index for a second vertex corresponding to a connectivity correction is determined, and in response to an existence of a first edge connecting the first vertex and the second vertex in the inferred edges, the first edge is removed from the recovered connectivity. In an example, in response to the first vertex and the second vertex being a first pair of diagonal vertices of a quadrilateral, a second edge connecting a second pair of diagonal vertices of the quadrilateral is added into the recovered connectivity. In some examples, in response to a nonexistence of a first edge connecting the first vertex and the second vertex in the inferred edges, the first edge connecting the first vertex and the second vertex is added in the recovered connectivity. In response to the first vertex and the second vertex being a first pair of diagonal vertices of a quadrilateral, a second edge connecting a second pair of diagonal vertices of the quadrilateral is removed from the recovered connectivity.

In some examples, to decode the sequence of indices indicating the set of vertices for the connectivity corrections, a first signal corresponding to a second index for a second vertex is decoded and a second signal corresponding to a difference between the second index and a third index for a third vertex is decoded.

In some examples, to derive the inferred connectivity and decode the connectivity differences, for a first vertex, a first set of vertices that is connected with the first vertex in the inferred connectivity is derived. Then, a flag associated with the first vertex is derived from the bitstream. The flag indicates whether one of more connectivity corrections is associated with the first vertex. In response to the flag indicating one of more connectivity correction associated with the first vertex, a sequence of indices indicating a second set of vertices respectively corresponding to the one or more connectivity corrections associated with the first vertex is decoded from the bitstream.

In some examples, to decode the connectivity differences, an index of a first vertex in the subset of the vertices is decoded and a valence difference is decoded from the bitstream. Then, a recovered valence of the first vertex is determined by adding the second valence with the valence difference.

Then, the process proceeds to (S1899) and terminates.

The process (1800) can be suitably adapted. Step(s) in the process (1800) can be modified and/or omitted. Additional step(s) can be added. Any suitable order of implementation can be used.

Figure 19:
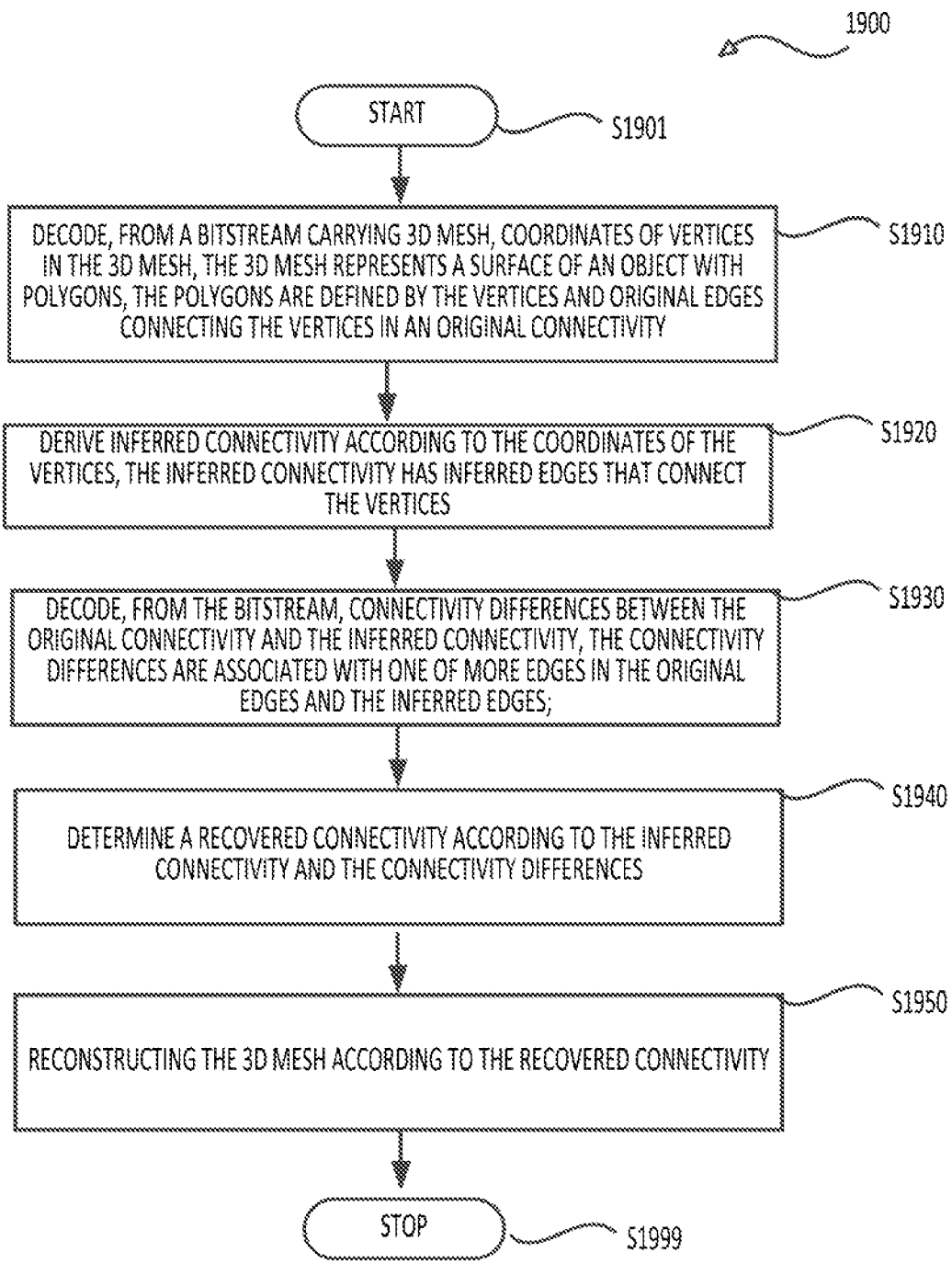
FIG. 19 shows a flow chart outlining a process example in some examples.

FIG. 19 shows a flow chart outlining a process (1900) according to an embodiment of the disclosure. The process (1900) can be used during a decoding process for a mesh. In various embodiments, the process (1900) is executed by processing circuitry. In some embodiments, the process (1900) is implemented in software instructions, thus when the processing circuitry executes the software instructions, the processing circuitry performs the process (1900). The process starts at (S1901) and proceeds to (S1910).

At (S1910), from a bitstream carrying a three dimensional (3D) mesh, coordinates (e.g., 3D coordinates and/or UV coordinates) of vertices in the 3D mesh are decoded. The 3D mesh represents a surface of an object with polygons, the polygons are defined by the vertices and an original connectivity of original edges connecting the vertices.

At (S1920), an inferred connectivity having inferred edges that connect the vertices is derived according to the coordinates of the vertices.

At (S1930), from the bitstream, connectivity differences are decoded, the connectivity differences are associated with one or more edges in the original edges and the inferred edges.

At (S1940), a recovered connectivity is determined according to the inferred connectivity and the connectivity differences.

At (S1950), the 3D mesh is reconstructed according to the recovered connectivity.

In some examples, to decode the connectivity differences, signals indicating a first vertex and a second vertex of a first edge are decoded from the bitstream. In an example, a first value corresponding to a first index of the first vertex is decoded and a second value corresponding to a difference between the first index and a second index of the second vertex is decoded from the bitstream.

In some examples, to determining the recovered connectivity, in response to an existence of the first edge connecting the first vertex and the second vertex in the second edges, the first edge is removed from the recovered connectivity. In an example, in response to the first vertex and the second vertex being a first pair of diagonal vertices of a quadrilateral, a second edge connecting a second pair of diagonal vertices of the quadrilateral is added in the recovered connectivity.

In some examples, to determining the recovered connectivity, in response to a nonexistence of the first edge connecting the first vertex and the second vertex in the inferred edges, the first edge connecting the first vertex and the second vertex is added in the recovered connectivity. In an example, in response to the first vertex and the second vertex being a first pair of diagonal vertices of a quadrilateral, a second edge connecting a second pair of diagonal vertices of the quadrilateral is removed from the recovered connectivity.

In some examples, to decoding the connectivity differences, flags respectively associated with the inferred edges are decoded from the bitstream, a flag associated with an inferred edge indicates whether the inferred edge exists in the original connectivity (e.g., one of the original edges).

Then, the process proceeds to (S1999) and terminates.

The process (1900) can be suitably adapted. Step(s) in the process (1900) can be modified and/or omitted. Additional step(s) can be added. Any suitable order of implementation can be used.

The techniques disclosed in the present disclosure may be used separately or combined in any order. Further, each of the techniques (e.g., methods, embodiments), encoder, and decoder may be implemented by processing circuitry (e.g., one or more processors or one or more integrated circuits). In some examples, the one or more processors execute a program that is stored in a non-transitory computer-readable medium.

The techniques described above, can be implemented as computer software using computer-readable instructions and physically stored in one or more computer-readable media. For example, FIG. 20 shows a computer system (2000) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 20:
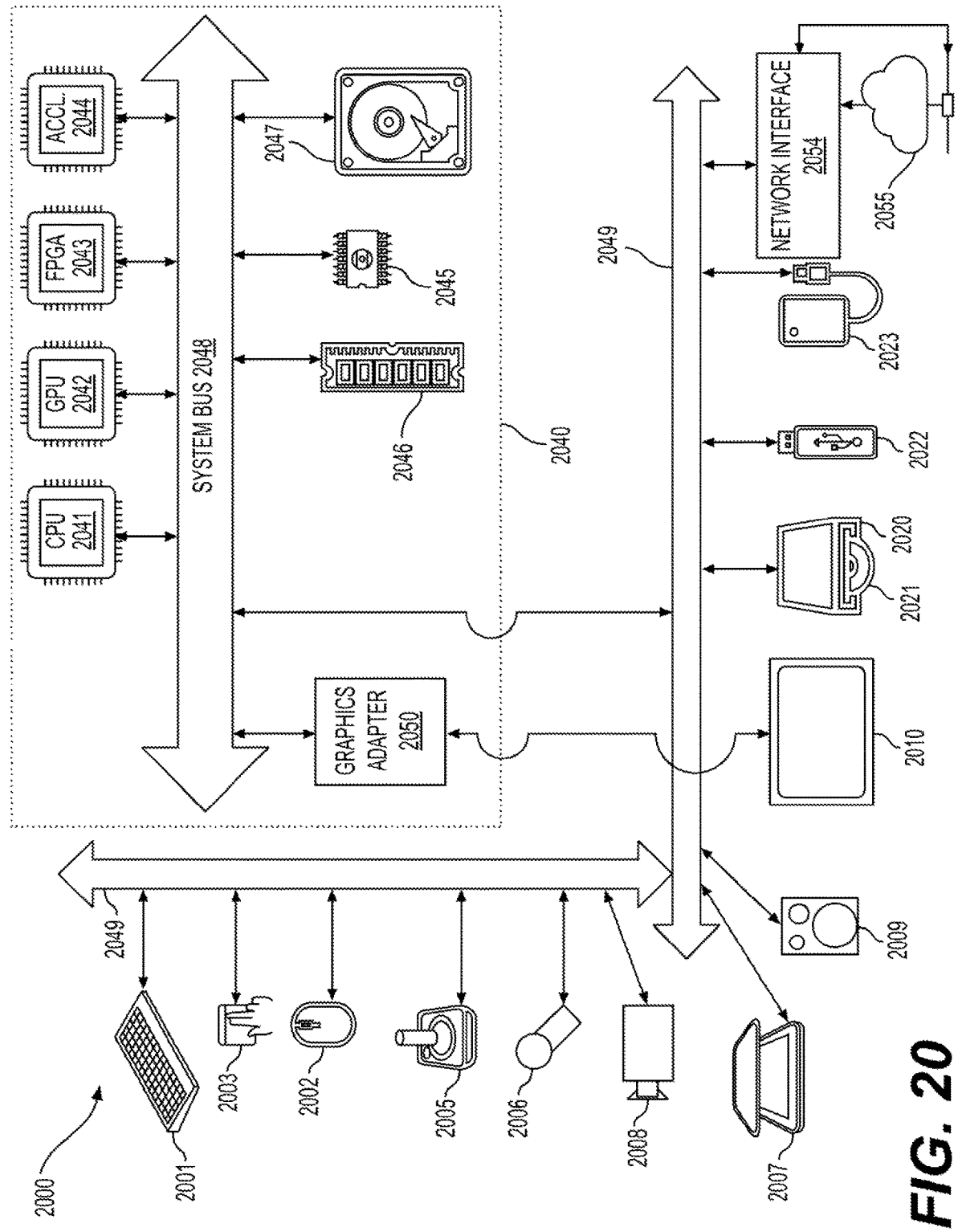
FIG. 20 is a schematic illustration of a computer system in some examples.

The components shown in FIG. 20 for computer system (2000) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (2000).

Computer system (2000) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (2001), mouse (2002), trackpad (2003), touch screen (2010), data-glove (not shown), joystick (2005), microphone (2006), scanner (2007), camera (2008).

Computer system (2000) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (2010), data-glove (not shown), or joystick (2005), but there can also be tactile feedback devices that do not serve as input devices), audio output devices (such as: speakers (2009), headphones (not depicted)), visual output devices (such as screens (2010) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (2000) can also include human accessible storage devices and their associated media such as optical media including CD/DVD ROM/RW (2020) with CD/DVD or the like media (2021), thumb-drive (2022), removable hard drive or solid state drive (2023), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (2000) can also include an interface (2054) to one or more communication networks (2055). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (2049) (such as, for example USB ports of the computer system (2000)); others are commonly integrated into the core of the computer system (2000) by attachment to a system bus as described below (for example Ethernet interface into a PC computer system or cellular network interface into a smartphone computer system). Using any of these networks, computer system (2000) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (2040) of the computer system (2000).

The core (2040) can include one or more Central Processing Units (CPU) (2041), Graphics Processing Units (GPU) (2042), specialized programmable processing units in the form of Field Programmable Gate Areas (FPGA) (2043), hardware accelerators for certain tasks (2044), graphics adapters (2050), and so forth. These devices, along with Read-only memory (ROM) (2045), Random-access memory (2046), internal mass storage such as internal non-user accessible hard drives, SSDs, and the like (2047), may be connected through a system bus (2048). In some computer systems, the system bus (2048) can be accessible in the form of one or more physical plugs to enable extensions by additional CPUs, GPU, and the like. The peripheral devices can be attached either directly to the core's system bus (2048), or through a peripheral bus (2049). In an example, the screen (2010) can be connected to the graphics adapter (2050). Architectures for a peripheral bus include PCI, USB, and the like.

CPUs (2041), GPUs (2042), FPGAs (2043), and accelerators (2044) can execute certain instructions that, in combination, can make up the aforementioned computer code. That computer code can be stored in ROM (2045) or RAM (2046). Transitional data can be also be stored in RAM (2046), whereas permanent data can be stored for example, in the internal mass storage (2047). Fast storage and retrieve to any of the memory devices can be enabled through the use of cache memory, that can be closely associated with one or more CPU (2041), GPU (2042), mass storage (2047), ROM (2045), RAM (2046), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (2000), and specifically the core (2040) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (2040) that are of non-transitory nature, such as core-internal mass storage (2047) or ROM (2045). The software implementing various embodiments of the present disclosure can be stored in such devices and executed by core (2040). A computer-readable medium can include one or more memory devices or chips, according to particular needs. The software can cause the core (2040) and specifically the processors therein (including CPU, GPU, FPGA, and the like) to execute particular processes or particular parts of particular processes described herein, including defining data structures stored in RAM (2046) and modifying such data structures according to the processes defined by the software. In addition or as an alternative, the computer system can provide functionality as a result of logic hardwired or otherwise embodied in a circuit (for example: accelerator (2044)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for mesh decompression, comprising:
   decoding, from a bitstream carrying a three dimensional (3D) mesh, coordinates of vertices in the 3D mesh, the 3D mesh representing a surface of an object with polygons, the polygons being defined by the vertices and an original connectivity having original edges connecting the vertices;
   deriving an inferred connectivity having inferred edges connecting the vertices according to the coordinates of the vertices;
   decoding, from the bitstream, connectivity differences being associated with a subset of the vertices, the connectivity differences between the original connectivity and the inferred connectivity associated with the subset of the vertices being encoded in the bitstream, each of the subset of the vertices being associated with at least one connectivity correction;
   determining a recovered connectivity according to the inferred connectivity and the connectivity differences; and
   reconstructing the 3D mesh according to the recovered connectivity, wherein
   the connectivity differences indicate that (i) the subset of the vertices includes a first vertex that is associated with one or more connectivity corrections and (ii) one or more vertices correspond to the one or more connectivity corrections, the one or more vertices excluding the first vertex; and
   the determining the recovered connectivity includes:
      determining a second vertex in the one or more vertices that corresponds to a connectivity correction in the one or more connectivity corrections; and
      when the inferred edges in the inferred connectivity include a first edge connecting the first vertex and the second vertex corresponding to the connectivity correction, removing the first edge from the inferred connectivity, the recovered connectivity not including the first edge.

2. The method of claim 1, wherein the decoding the connectivity differences further comprises:
   decoding a first value from the bitstream, the first value indicating a number for vertices in the subset of the vertices.

3. The method of claim 2, further comprising:
   decoding a first index for the first vertex in the subset of the vertices;
   decoding a second value from the bitstream, the second value indicating a number of the one or more connectivity corrections associated with the first vertex; and
   decoding a sequence of indices indicating the one or more vertices respectively corresponding to the one or more connectivity corrections associated with the first vertex.

4. The method of claim 3, wherein the determining the recovered connectivity further comprises:
   determining a second index for the second vertex.

5. The method of claim 4, further comprising:
   when the first vertex and the second vertex being are a first pair of diagonal vertices of a quadrilateral, adding a second edge connecting a second pair of diagonal vertices of the quadrilateral in the recovered connectivity, the first vertex and the second vertex being two non-adjacent vertices of the quadrilateral, the second pair of diagonal vertices not being adjacent.

6. The method of claim 3, wherein the determining the recovered connectivity further comprises:
   determining a second index of the second vertex; and
   when the inferred edges do not include the first edge, adding the first edge connecting the first vertex and the second vertex to the inferred connectivity, the recovered connectivity including the first edge.

7. The method of claim 6, further comprising:
   when the first vertex and the second vertex being are a first pair of diagonal vertices of a quadrilateral, removing a second edge connecting a second pair of diagonal vertices of the quadrilateral from the inferred connectivity, the recovered connectivity not including the second edge, the first vertex and the second vertex being two non-adjacent vertices of the quadrilateral, the second pair of diagonal vertices not being adjacent.

8. The method of claim 3, wherein the decoding the sequence of indices further comprises:
   decoding, from the bitstream, a first signal indicating a second index for the second vertex; and
   decoding a second signal from the bitstream, the second signal being a difference between the second index and a third index for a third vertex in the sequence of indices.

9. The method of claim 1, wherein the deriving the inferred connectivity and the decoding the connectivity differences further comprises:
   deriving, for the first vertex, a first set of vertices that is connected with the first vertex in the inferred connectivity;
   decoding a flag associated with the first vertex from the bitstream, the flag indicating the one of more connectivity corrections associated with the first vertex; and
   decoding, from the bitstream, a sequence of indices indicating of the one or more vertices respectively corresponding to the one or more connectivity corrections associated with the first vertex.

10. The method of claim 1, wherein the decoding the connectivity differences further comprises:
    decoding an index of the first vertex in the subset of the vertices from the bitstream;
    decoding a valence difference from the bitstream; and
    determining a recovered valence of the first vertex by adding the valence difference with an inferred valence of the first vertex in the inferred connectivity.

11. A method for mesh decompression, comprising:
    decoding, from a bitstream carrying a three dimensional (3D) mesh, coordinates of vertices in the 3D mesh, the 3D mesh representing a surface of an object with polygons, the polygons being defined by the vertices and an original connectivity having original edges connecting the vertices;
    deriving, according to the coordinates of the vertices, an inferred connectivity having inferred edges that connect the vertices;
    decoding, from the bitstream, connectivity differences associated with one or more edges in the original edges and the inferred edges;
    determining a recovered connectivity according to the inferred connectivity and the connectivity differences; and
    reconstructing the 3D mesh according to the recovered connectivity.

12. The method of claim 11, wherein the decoding the connectivity differences further comprise:
    decoding signals in the bitstream that indicate a first vertex and a second vertex of a first edge.

13. The method of claim 12, wherein the decoding the signals comprises:
  decoding a first value corresponding to a first index of the first vertex; and
  decoding a second value corresponding to a difference between the first index and a second index of the second vertex.

14. The method of claim 12, wherein the determining the recovered connectivity further comprises:
  in response to an existence of the first edge connecting the first vertex and the second vertex in the inferred edges, removing the first edge from the recovered connectivity.

15. The method of claim 14, further comprising:
  in response to the first vertex and the second vertex being a first pair of diagonal vertices of a quadrilateral, adding a second edge connecting a second pair of diagonal vertices of the quadrilateral in the recovered connectivity.

16. The method of claim 12, wherein the determining the recovered connectivity further comprises:
  in response to a nonexistence of the first edge connecting the first vertex and the second vertex in the inferred edges, adding the first edge connecting the first vertex and the second vertex in the recovered connectivity.

17. The method of claim 16, further comprising:
  in response to the first vertex and the second vertex being a first pair of diagonal vertices of a quadrilateral, removing a second edge connecting a second pair of diagonal vertices of the quadrilateral from the recovered connectivity.

18. The method of claim 11, wherein the decoding the connectivity differences further comprise:
  decoding flags respectively associated with the inferred edges, a flag associated with an inferred edge indicating whether the inferred edge exists in the original edges.

19. An apparatus for mesh compression, comprising processing circuitry configured to:
  derive an inferred connectivity having inferred edges connecting vertices in a three dimensional (3D) mesh according to coordinates of the vertices in the 3D mesh, the 3D mesh representing a surface of an object with polygons, the polygons being defined by the vertices and an original connectivity having original edges connecting the vertices;
  determining connectivity differences being associated with a subset of the vertices based on the original connectivity and the inferred connectivity, each of the subset of the vertices being associated with at least one connectivity correction; and
  encode the connectivity differences in a bitstream, wherein
  the connectivity differences indicate that:
    the subset of the vertices includes a first vertex that is associated with one or more connectivity corrections;
    one or more vertices correspond to the one or more connectivity corrections, the one or more vertices excluding the first vertex;
    a second vertex in the one or more vertices corresponds to a connectivity correction in the one or more connectivity corrections; and
    when the inferred edges in the inferred connectivity include a first edge connecting the first vertex and the second vertex corresponding to the connectivity correction, the first edge is to be removed from the inferred connectivity.

20. The apparatus of claim 19, wherein the processing circuitry is configured to:
  encode a first value in the bitstream, the first value indicating a number for vertices in the subset of the vertices;
  encode a first index for the first vertex in the subset of the vertices;
  encode a second value in the bitstream, the second value indicating a number of the one or more connectivity corrections associated with the first vertex; and
  encode a sequence of indices indicating a set of vertices including the second vertex respectively corresponding to the one or more connectivity corrections associated with the first vertex.

* * * * *